(12) United States Patent
Warnock

(10) Patent No.: US 10,511,520 B1
(45) Date of Patent: Dec. 17, 2019

(54) MULTI-HOP PATH FINDING

(71) Applicant: RIPPLE LABS INC., San Francisco, CA (US)

(72) Inventor: Michael Warnock, San Francisco, CA (US)

(73) Assignee: Ripple Labs Inc., San Francisco, CA (US)

( * ) Notice: Subject to any disclaimer, the term of this patent is extended or adjusted under 35 U.S.C. 154(b) by 0 days.

(21) Appl. No.: 15/991,820

(22) Filed: May 29, 2018

(51) Int. Cl.
*H04L 12/733* (2013.01)
*H04L 12/727* (2013.01)
*H04L 12/707* (2013.01)
*H04L 12/721* (2013.01)
*H04L 12/761* (2013.01)
*H04L 12/751* (2013.01)

(52) U.S. Cl.
CPC ............ *H04L 45/20* (2013.01); *H04L 45/121* (2013.01); *H04L 45/123* (2013.01); *H04L 45/16* (2013.01); *H04L 45/22* (2013.01); *H04L 45/02* (2013.01)

(58) Field of Classification Search
CPC ..... H04L 45/20; H04L 45/121; H04L 45/123; H04L 45/16; H04L 45/22; H04L 45/02
See application file for complete search history.

(56) References Cited

U.S. PATENT DOCUMENTS

| | | | |
|---|---|---|---|
| 6,014,627 A | 1/2000 | Togher | |
| 7,194,543 B2 | 3/2007 | Robertson | |
| 10,055,715 B1* | 8/2018 | Grassadonia | G06Q 20/065 |
| 10,102,577 B2* | 10/2018 | Merold | G06Q 40/04 |
| 10,269,009 B1* | 4/2019 | Winklevoss | G06Q 20/3674 |
| 2001/0056398 A1* | 12/2001 | Scheirer | G06Q 40/02 705/38 |
| 2008/0249924 A1* | 10/2008 | Chiulli | G06Q 40/025 705/37 |
| 2009/0112775 A1* | 4/2009 | Chiulli | G06Q 40/025 705/36 R |
| 2010/0332650 A1* | 12/2010 | Aisen | H04L 43/0852 709/224 |
| 2014/0180893 A1* | 6/2014 | Dale | G06Q 40/04 705/37 |

(Continued)

OTHER PUBLICATIONS

International Search Report and Written Opinion for Application No. PCT/US2019/033685, dated Jul. 24, 2019, 11 pages.

*Primary Examiner* — Stephen J Clawson
(74) *Attorney, Agent, or Firm* — Morris & Kamlay LLP

(57) ABSTRACT

Systems and techniques are provided for multi-hop path finding. Order data describing an order may be received. The order data may include a currency pair, a price level, and a volume. A one-hop path structure may be generated based on the order data describing the order. The one-hop path structure may include one-hop paths for the currency pair. The one-hop path structure may be written to a first ring buffer. The one-hop path structure may be read from the first ring buffer. Two-hop path structures may be generated by joining the one-hop path structure with other one-hop path structures. A value for the relative importance of the two-hop path structures may be determined to be greater than a threshold. Combined two-hop path structures may be written to a second ring buffer when the value for the relative importance of the two-hop path structures is greater than the threshold.

20 Claims, 10 Drawing Sheets

(56) References Cited

U.S. PATENT DOCUMENTS

| | | | |
|---|---|---|---|
| 2014/0207640 A1* | 7/2014 | Dilkes | G06Q 40/04 705/37 |
| 2015/0073967 A1* | 3/2015 | Katsuyama | G06Q 40/04 705/37 |
| 2015/0081508 A1* | 3/2015 | Schwall | G06Q 40/04 705/37 |
| 2015/0088726 A1* | 3/2015 | Aisen | H04L 67/325 705/37 |
| 2015/0379638 A1 | 12/2015 | Glodjo | |
| 2016/0078537 A1* | 3/2016 | Katsuyama | G06Q 40/06 705/37 |
| 2016/0078538 A1* | 3/2016 | Katsuyama | G06Q 40/04 705/37 |
| 2016/0182330 A1* | 6/2016 | Iannaccone | H04L 67/1095 709/224 |
| 2016/0182331 A1* | 6/2016 | Iannaccone | G06Q 10/06 709/224 |
| 2016/0205174 A1* | 7/2016 | Pitio | H04L 67/10 709/201 |
| 2016/0224949 A1 | 8/2016 | Thomas | |

\* cited by examiner

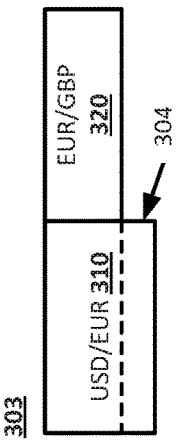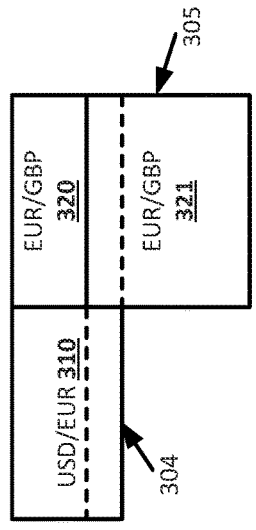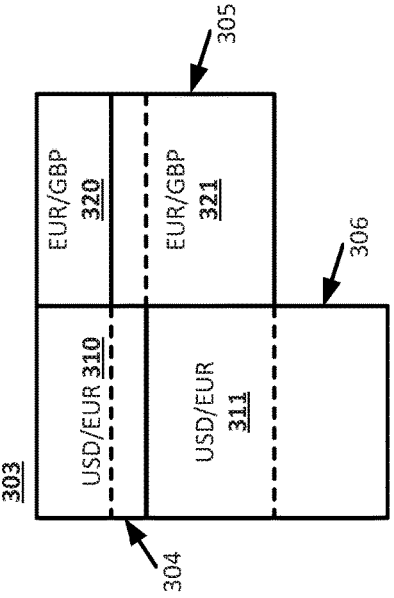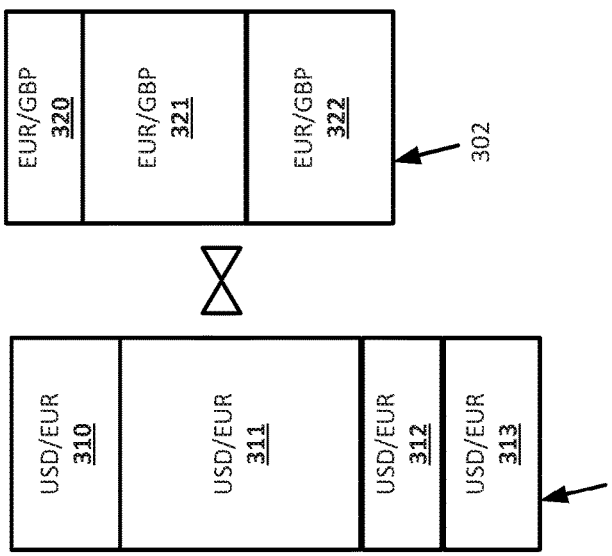

FIG. 4D

| | | |
|---|---|---|
| USD/EUR 410 | EUR/GBP 411 | GBP/Yen 412 | ← 441
| USD/EUR 419 | EUR/GBP 420 | AUD/Yen 421 | ← 444
| USD/AUD 422 | AUD/GBP 423 | GBP/Yen 424 | ← 445

| | | |
|---|---|---|
| USD/EUR 410 | EUR/GBP 411 | GBP/Yen 412 | ← 441
| USD/EUR 419 | EUR/GBP 420 | AUD/Yen 421 | ← 444
| USD/AUD 422 | AUD/GBP 423 | GBP/Yen 424 | ← 445
| USD/CAD 413 | CAD/AUD 414 | AUD/Yen 415 | ← 442

| | | |
|---|---|---|
| USD/EUR 410 | EUR/GBP 411 | GBP/Yen 412 | ← 441
| USD/EUR 419 | EUR/GBP 420 | AUD/Yen 421 | ← 444
| USD/AUD 422 | AUD/GBP 423 | GBP/Yen 424 | ← 445
| USD/CAD 413 | CAD/AUD 414 | AUD/Yen 415 | ← 442
| USD/GBP 425 | GBP/EUR 426 | EUR/Yen 427 | ← 446

| | | |
|---|---|---|
| USD/EUR 410 | EUR/GBP 411 | GBP/Yen 412 | ← 441
| USD/EUR 419 | EUR/GBP 420 | AUD/Yen 421 | ← 444
| USD/AUD 422 | AUD/GBP 423 | GBP/Yen 424 | ← 445
| USD/CAD 413 | CAD/AUD 414 | AUD/Yen 415 | ← 442
| USD/GBP 425 | GBP/EUR 426 | EUR/Yen 427 | ← 446
| USD/CAD 428 | CAD/EUR 429 | EUR/Yen 430 | ← 447

| | | | |
|---|---|---|---|
| USD/EUR 410 | EUR/GBP 411 | GBP/Yen 412 | ← 441 |
| USD/EUR 419 | EUR/GBP 420 | AUD/Yen 421 | ← 444 |
| USD/AUD 422 | AUD/GBP 423 | GBP/Yen 424 | ← 445 |
| USD/CAD 413 | CAD/AUD 414 | AUD/Yen 415 | ← 442 |
| USD/GBP 425 | GBP/EUR 426 | EUR/Yen 427 | ← 446 |
| USD/CAD 428 | CAD/EUR 429 | EUR/Yen 430 | ← 447 |
| USD/GPB 416 | GBP/AUD 417 | AUD/Yen 418 | ← 443 |

MULTI-HOP PATH FINDING

BACKGROUND

Networks may allow for multi-hop paths between various beginning and ending points on the network. The processing time needed to generate all possible paths with a certain number of hops may increase as the numbers of hops increases. The one-hop paths available in such a network may also change, as one-hop paths may be added, removed, or modified. Changes to the one-hop paths available in a network may require additional processing time to update all the possible multi-hop paths. This may make it difficult to reduce the latency in the generation of multi-hop paths, increasing the number of times a multi-hop path is generated after it is no longer useful due to one of its one-hop paths having been removed or modified in the time it took to generate the multi-hop path.

BRIEF SUMMARY

In an implementation, a first thread may be executed. The first thread may repeat operations that include receiving order data describing an order, the order data including a currency pair, a price level, and a volume, generating a one-hop path structure based on the order data describing the order, the one-hop path structure including one-hop paths for the currency pair, determining a relative importance value for the generated one-hop path structure, and writing the generated one-hop path structure to a first ring buffer when the relative importance value of the one-hop path structure greater than a first threshold. A second thread may be executed. The second thread may repeat operations that include checking the first ring buffer until a one-hop path structure is available in the first ring buffer after being written to the first ring buffer by the first thread, reading, from the first ring buffer, a one-hop path structure written to the first ring buffer by the first thread, generating two-hop path structures by joining the one-hop path structure read from the first ring buffer with other one-hop path structures, determining a relative importance value for at least one of the generated one or more two-hop path structures, and writing a combined two hop-path structure based on any of the generated two-hop path structures with a relative importance value greater than a second threshold to a second ring buffer. A third thread may be executed. The third thread may repeat operations that include checking the second ring buffer until a combined two-hop path structure is available in the second ring buffer after being written to the second ring buffer by the second thread, reading, from the second ring buffer, the combined two-hop path structure written to the second ring buffer by the second thread, and generating three-hop path structures by joining the two-hop path structure read from the second ring buffer with one or more one-hop path structures.

Systems and techniques disclosed herein may allow for multi-hop path finding. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3A shows an example join operation suitable for multi-hop path finding according to an implementation of the disclosed subject matter.

FIG. 3B shows an example join operation suitable for multi-hop path finding according to an implementation of the disclosed subject matter.

FIG. 3C shows an example join operation suitable for multi-hop path finding according to an implementation of the disclosed subject matter.

FIG. 3D shows an example join operation suitable for multi-hop path finding according to an implementation of the disclosed subject matter.

FIG. 4D shows an example combine operation suitable for multi-hop path finding according to an implementation of the disclosed subject matter.

FIG. 4E shows an example combine operation suitable for multi-hop path finding according to an implementation of the disclosed subject matter.

FIG. 4F shows an example combine operation suitable for multi-hop path finding according to an implementation of the disclosed subject matter.

FIG. 4G shows an example combine operation suitable for multi-hop path finding according to an implementation of the disclosed subject matter.

FIG. 4H shows an example combine operation suitable for multi-hop path finding according to an implementation of the disclosed subject matter.

DETAILED DESCRIPTION

Figure 1:
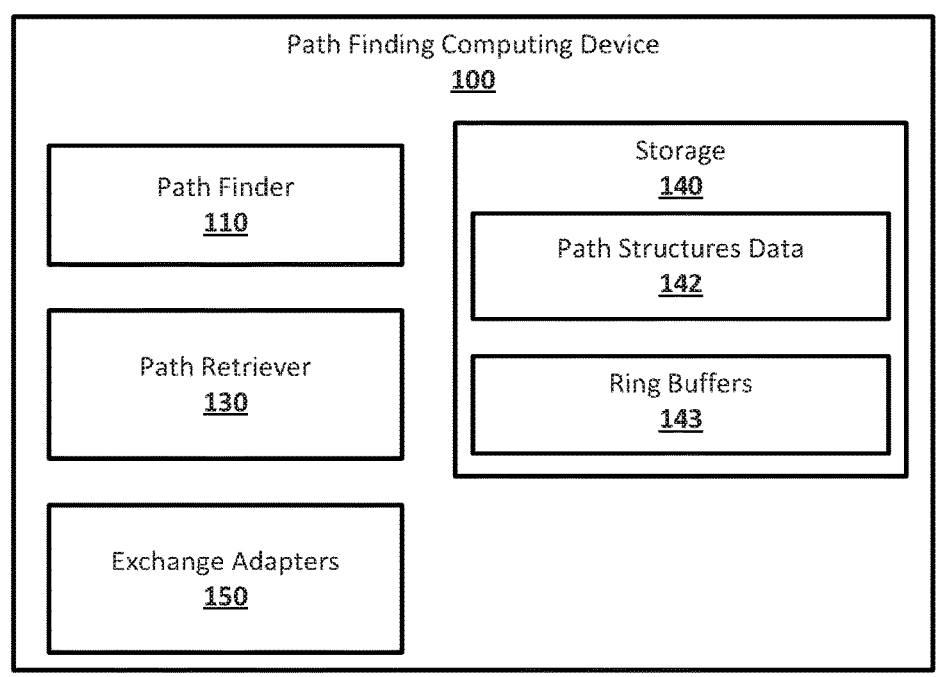
FIG. 1 shows an example system suitable for multi-hop path finding according to an implementation of the disclosed subject matter.

According to embodiments disclosed herein, multi-hop path finding may allow for the generation of multi-hop paths within a network with reduced latency. One-hop paths may be received from the network. The one-hop paths with the same starting and ending points within the network may be joined into one-hop path structures. The one-hop path structures may then be joined into multi-hop paths of varying lengths. As the one-hop paths change, due to paths being added, removed, or modified, new or updated one-hop paths may be evaluated to determine whether they should be used to update or create new one-hop path structures. New or updated one-hop path structures may be evaluated to determine if they are important enough to be used to generate multi-hop paths for new or updated multi-hop path structures. The evaluations may occur for each length of multi-hop path, so that the number of new or updated path structures may be used to generate multi-hop paths of longer lengths doesn't increase exponentially. This may reduce the latency needed to generate multi-hop paths of any length, as only important new or updated path structures may be used to generate multi-hop paths of increasing lengths.

The network may be, for example, a currency exchange network. Exchanges may be computing devices of any suitable type operating in the currency exchange network. The exchanges may make orders available. An order may include a currency pair with a starting currency and an ending currency, a price level, and a volume or capacity. The starting currency may be the currency which the order offers to exchange for the ending currency, and the price level may be the price of the exchange, or the exchange rate. The volume or capacity may be, for example, the amount of the starting currency that the order offers to exchange for the ending currency. An exchange may make any number of orders available, between any suitable currency pairs, and at any suitable price levels. An exchange may include multiple orders with the same starting and ending currency and the same or different price levels and volumes. Orders may be made available on an exchange in any suitable manner. For example, the orders may be placed on the exchange through computing devices with access to the exchange.

A path finding system may be a computing device or devices, such as, for example, a server system, connected to the currency exchange network. The path finding system may receive data about the available orders in the currency exchange network in any suitable manner. For example, the exchanges, which may be computing devices or systems within the currency exchange network, may transmit data on available orders to the path finding system. The data about the available orders may be transmitted voluntarily by the exchanges, or may be transmitted based on requests form the path finding system. Orders may remain on the exchanges where they originate when data about the orders is sent to the path finding system. The path finding system may include exchange adapters which may receive the data about the orders from the exchanges. For example, the path finding system may include separate exchange adapters for exchange from which data about orders will be received. An exchange adapter may receive individual new or updated orders from an exchange, or may receive the entire order book, including all orders, from the exchange, and may determine which of the orders in the order book are new or updated.

The exchange adapters may control the flow of data about new or updated orders from the exchanges to the rest path finding system using a set point. The set point may be a value used to determine whether a new or updated order at an exchange is important enough to be passed on to the rest of the path finding system from the exchange adapters. The importance of a new or updated order received at an exchange adapter may be determined according to:

$$\sigma\left(\left(\frac{updateSize}{sizeSoFar}\right)\left(\frac{levelsRemaining}{levelsTotal}\right)\right) \quad (1)$$

where updateSize may be the volume of a new or updated order, sizesSoFar may be the total volume on the exchange from which the order was received for the currency pair of the new or updated order, levelsRemaining may be the number of remaining price levels for the currency pair on the exchange on which the new or updated originated, and levelsTotal may be the number of total price levels on the exchange for the currency pair. The set point may be based on, for example, the latency, or amount of time it may take, for a new or updated order that is passed on to the rest of the path finding system from the exchange adapters to have a completed a combine operation performed with it by the path finding system to generate a new or updated one-hop path structure. Longer amounts of time may be lead to higher set points, increasing the importance a new or updated order needs to be passed on to the rest of the path finding system from the exchange adapters. New or updated orders which are not passed on to the rest of the path finding system may not be considered when determining the set point. The set point may be determined using a proportional-integral-derivative (PID) controller, which may prevent the set point from oscillating as latency in the processing of new or updated orders varies. This may allow for control of the flow data about new or updated orders into the path finding system from the exchanges, allowing the generation of multi-hop paths with reduced latency while making more efficient use of computational power.

When an exchange adapter determines that the importance of a new or updated order, as determined according (1), is not greater than a threshold value based on the set point, the new or updated order may not be sent from the exchange adapter to the rest of the path finding system. This may reduce the computational power, including processing time, used by the path finding system, as it may not need to update multi-hop paths every time an exchange has a new or updated order. As the rate at which data about new or updated orders arrives at the path finding system from the exchanges increases, a queue of new or updated orders to be processed may increase in size. This may increase the latency between the arrival of a new or updated order and the completion of a combine operation with that new or updated order. The increase in latency may increase the set point. The increase in the set point my result in fewer new or updated orders being sent to rest of the path finding system from the exchange adapters, as fewer new or updated orders may have an importance that exceeds the increased set point. This may prevent new or updated orders from being added to the end of a long queue that would result in multi-hop paths generated based on the new or updated orders not being generated in a timely manner. Conversely, the set point may decrease as the path finding system processes already received new or updated orders, allowing the exchange adapters to send additional new or updated orders to the rest of the path finding system. This may ensure that, as long as orders are being added to or updated on the exchanges, the path finding system will have enough new or updated orders to work with to ensure it receives important updates, but not enough to cause the amount of processing time needed to generate multi-hop paths to exceed the useful lifespan of those multi-hop paths. The use of processing resources may thus be optimized by embodiments of the present invention that balance the number of new and updated orders accommodated with the speed of generating new multi-hop paths that provide the most efficient way to traverse the network. Put another way, embodiments of the present invention produce better results while using less processing power than other, less efficient systems.

New or updated orders whose importance exceeds a threshold value based on the set point may be sent to the path finding system. The path finding system may add together received orders into one-hop paths. Received orders may be added to existing one-hop paths for the same currency pair at the same price level at the same exchange, or new one-hop paths may be created when there are no extant one-hop paths for the currency pair of the received order. The volume of a one-hop path may be the sum of the volumes of the orders added together to generate the one-hop path. For example, if the path finding system receives an order from an exchange that has the same currency pair and price level as another order previously received from the exchange, which may exist as a one-hop path for the currency pair, the orders may be added together into an updated one-hop path for the currency pair and price level. The volume of the updated one-hop path may be the sum of the volumes of the two orders that were added together. If a third order for the same currency pair is received from the exchange with a different price level, the third order may be used on its own to generate a one-hop path if no current one-hop path is based on an order from the same exchange for the same currency pair at the same price level as the third order.

The path finding system may then update already generated one-hop path structures by performing a combine operation, or generate new one-hop path structures as necessary, based on the received orders and the new or updated one-hop paths. A one-hop path structure may be a combination of one-hop paths, or path segments, that include the same currency pair, with the same starting currency and ending currency, across all the exchanges from which the path finding system has received orders that include that currency pair. There may be a one-hop path structure for each currency pair for which there is an order on any exchange in the currency exchange network. The one-hop path structures may be a first level order book for the currency exchange network. A one-hop path structure may include one-hop paths at varying price levels and volumes, based on orders from different exchanges, for the same currency pair. The one-hop paths in a one-hop path structure may be ordered by price level, which may be necessary for appropriate operation of the path finding system. The new or updated one-hop path structures may be evaluated to determine if they should be used by the path finding system in the generation of two-hop paths.

The path finding system may join one-hop path structures to generate two-hop path structures. Two one-hop path structures may be joined into a two-hop path structure when the ending currency of a first of the one-hop path structure matches the starting currency of a second of the one-hop path structure. The two-hop path structure may include two-hop paths that may start with the starting currency of the first of the one-hop path structure, go through the currency in common between the two one-hop path structures, and end with the ending currency of the second of the one-hop path structure. The path finding system may perform a join operation to join two one-hop path structures into a two-hop path structure. The join operation may be performed using any new or updated one-hop path structures, joining them to any suitable one-hop path structures from the already extant one-hop path structures. The path finding system may use the join operation to generate two-hop path structures, with two-hop paths, for any currency pair, and with any currency in common between hops, made possible by the starting and ending currencies of the new or updated one-hop path structures and the already extant one-hop path.

A join operation may be performed by the path finding system on two one-hop path structures when the starting currency of one of the sets of one-hop-paths matches the ending currency of the other of the one-hop path structures. The join operation may start by selecting the one-hop paths that are at the first price level of each of the one-hop path structures. This price level may be the best, or cheapest, price level belonging to a one-hop path in each one-hop path structure. The size of the individual-one-hop paths with the best price levels from each of the two one-hop path structures may be compared. Because each one-hop path structure represents a different currency pair, the volumes of price levels may not be comparable across one-hop path structures. The volume of the selected price level from one of the one-hop path structures may be multiplied by the reciprocal of the exchange rate for the selected price level from the other of the one-hop path structures, allowing for direct comparison. For example, if one of the price levels is from a one-hop path for a currency pair starting with USD and ending in EUR, and the other one-hop path starts with EUR and ends in GPB, the volume of the USD/EUR pair may be initially expressed in USD, while the volume of the EUR/GBP pair may be expressed in EUR. To compare the price levels directly when forming a USD/EUR/GBP path, the volume of the EUR/GBP price level, in EUR, may be multiplied by the reciprocal of the exchange rate between USD and EUR.

The path finding system may determine which of the one-hop paths selected based on their price levels has the larger volume. The path finding system may join the one-hop path with the smaller volume to a same-sized portion of the one-hop path with the larger volume. This may create partial two-hop path structure. The price level of the two-hop path formed by the joining of the one-hop paths selected based on their price levels may be an exchange rate that is the product of the exchange rates of the two one-hop paths used in the two-hop path. The volume of the two-hop path may be the smaller volume of the volumes of the two one-hop paths used in the two-hop path.

The path finding system may then check if there any one-hop paths at price levels different from previously selected price levels remaining in either of the two one-hop path structures. If one or both of the one-hop path structures has no one-hop paths at price levels that haven't already been selected during the join operation and joined to another one-hop path price level that covers the one-hop path's entire volume, the join operation may end and return the partial two-hop path structure as a two-hop path structure. Any volume of a one-hop path selected based on the last price level in the partial two-hop path structure which is not joined to another one-hop path may be discarded from the structure before it is returned.

If both one-hop path structures have remaining one-hop paths at other price levels that have either not been selected or been selected but not joined to a one-hop path that covers their entire volume, the path finding system may continue with the join operation. The path finding system may select a one-hop path at the next available price level from either of the one-hop path structures for which there is no remaining volume to be covered from the previously selected one-hop path at the previous price level. The path finding system may repeat comparing the sizes of the selected one-hop paths and joining the one-hop paths as part of the partial two-hop path structure. If a previously selected one-hop path that has been partially covered is being compared, only the uncovered portion of the one-hop path may be used. Once one of the one-hop path structures no longer have any remaining one-hop paths at any price levels, the partial two-hop path structure may be returned as the two-hop path structure. The returned two-hop path structure may be stored by the path finding system in any suitable manner. The two-hop path structure may include a number of different two-hop paths for a currency pair based on the starting currency of the first one-hop path structure used in the join operation and the ending currency of the second one-hop path structure used in the join operation. The two-hop paths may be ordered by price level in the two-hop path structure.

The path finding system may perform a combine operation using the new or updated two-hop path structures generated by the join operation. The path finding system may combine the new or updated two-hop path structure with an already existing two-hop path structure for the same currency pair as the new or updated two-hop path structure. For example, when a new two-hop path structure is for the currency pair USD/EUR, the path finding system may combine the new two-hop path structure with an already existing two-hop path structures for USD/EUR. The already existing two-hop path structure may be a combined two-hop path structure that is the result of previous combine operations. If no such combined two-hop path structure exists for the currency pair of the new or updated two-hop path structure, the new or updated two-hop path structure generated by the join operation may become the combined two-hop path structure for that currency pair. During the combine operation, while there are paths at any price level remaining in either the two-hop path structure or the combined two-hop path structure, the path finding system may compare the exchange rate of the best available price level from the two-hop path structure to determine if the price level of the two-hop path drops precipitously from the price level of the current two-hop path in the combined two-hop path structure. A price level from the two-hop path structure may show a precipitous drop when its exchange rate is much higher than the exchange rate for the compared price level from the combined two-hop path structure. If the price level does not drop precipitously, the path finding system may check to ensure that the two-hop paths that make up the paths of the price levels being considered have not already been added to a combine result structure. If the price levels have not already been added to the combine result structure, the exchange rates may be compared between two-hop path from the two-hop path structure and the two-hop path from combined two-hop path structure. The path with the lowest price level may be added to the combine result structure. This may be repeated until there are no paths remaining in either the two-hop path structure or the combined two-hop path structure that haven't been added to the combine result structure, or until a precipitous drop is detected. The combine result structure may include two-hop paths for the same currency pair, ordered by price level, and may be the new combined two-hop path structure for that currency pair.

Once there are no price levels remaining in either the two-hop path structure or the combined two-hop path structure, or a precipitous drop is detected, the combine result structure may be returned as the new combined two-hop path structure for the currency pair. A relative importance of the new or updated two-hop path structure as compared to the combined two-hop path structure used in the combined operation may also be returned. The relative importance may be determined according to:

$$\sigma\left(\left(\frac{\frac{RHSChosenCount}{LHSChosenCount}}{LHSTotalCount+0.1}\right)\right) \quad (2)$$

where RHSChosenCount may be the number of two-hop paths added to the combine result structure from the two-hop path structure, which may serve as the right hand side (RHS) of the combine operation, the LHChosenCount may be the number of two-hop paths added to the combine result structure from the combined two-hop path structure, which may serve as the left hand side (LHS) of the combine operation, and LHSTotalCount may be the total number of two-hop paths included in the combined two-hop path structure used in the combined operation. The relative importance may be a measurement of the importance of the new or updated two-hop path structure relative to the combined two-hop path structure used in the combine operation for their common currency pair.

The path finding system may compare the relative importance determined by a combine operation performed on a new or updated path structure to a threshold to determine if the new combine result structure returned by the combine operation should be used to generate multi-hop paths of the next path length. For example, the relative importance of a new or updated two-hop path structure may be used to determine if the new combined two-hop path structure should be used to generate three-hop paths. The threshold may be a function of the set point, as set by the PID controller, and the path length, such that the threshold may increase for longer path lengths. For example, the threshold may be higher for a three-hop path structure than for a two-hop path structure even if the set point is the same. This may limit the number of new combined path structures that are used to generate longer path lengths. This may reduce the latency of generating longer path lengths to account for changes in orders at the exchanges while still generating useful paths of longer lengths. This renders the computer system more efficient because the amount of computational power needed to generate multi-hop paths of varying lengths in a timely manner may be reduced. In this way, embodiments of the disclosed subject matter improve the performance of the processor by precluding it from generating spurious multi-hop paths that may be theoretically possible, but would in fact not be utilized by the user. For example, a new or updated one-hop path structure for a currency pair may be used to generate a new or updated two-hop path structure which may be combined into a new combined two-hop path structure, which may in turn be used to generate a new or updated three-hop path structure which may be combined into a new combined three-hop path structure, but the new or updated three-hop path structure may not have enough relative importance compared to the already existing combined three-hop path structure for that currency pair, as determined during a combine operation, for the new combined three-hop path structure to be used to generate a new or updated four-hop path structure. This may prevent the number of new or updated path structures being used at each successive path length from increasing exponentially due to combinatorial explosion. Additionally, increases in the set point may further reduce the number of new or updated orders that are used in the generation of paths of longer length. This may allow the latency between the receiving of a new or updated order and the use of new path structures generated due to the new or updated order in the generation of a path of a longer length, for example, a six-hop path, to remain low so that the paths of longer lengths may be generated fast enough to still be useful without requiring additional computational power. In other words, embodiments improve the performance of the computer system by enabling it to generate relevant paths more quickly. If a new or updated path structure is determined to be important enough to have the new combined path structures generated based on it be used to generate paths at the next path length, the new combined path structure may be copied into memory, such as a ring buffer, that may be used by an execution thread responsible for the generation of paths of the next path length.

The path finding system may repeat the join operation and the combine operations to generate new or updated path structures and combined path structures, and evaluate the importance of the new or updated path structures, for each path length evaluated by the path finding system. For path structures with paths of a specific path length, the path finding system may generate new or updated path structures at that specific path length using new combined path structures with paths of a previous path length that were generated based on new or updated path structures deemed important enough during a combine operation for the new combined path structure be used to generate path structures with paths of the specific path length. For example, if the path finding system generates paths up to a length of six hops, after performing the join and combine operations to generate and evaluate new or updated two-hop path structures and new combined two-hop path structures using a new or updated one-hop path structure, the path finding system may perform the join and combine operations to generate new or updated three-hop path structures and a new combined three-hop path structures using any of the new combined two-hop path structures based on new or updated two-hop path structures that are determined to be important enough by the combine operation performed using the new or updated two-hop path structure. The join operation to generate the new or updated three-hop path structures may join the new combined two-hop path structures with already extant one-hop path structures to generate three-hop path structures, including paths that have three hops. The combine operation may combine the new or updated three-hop path structures with an already existing combined three-hop path structure for the same currency pair as the new or updated three-hop path structure, generating a new combined three-hop path structure. If a new or updated three-hop path structure is determined to be important enough by the combine operation preformed using the three-hop path structure and existing combined three-hop path structure, the path finding system may then perform join and combine operations for four-hop paths using the new combined three-hop path structure. The join operation may join the new combined three-hop path structure with extant one-hop path structures to generate four-hop path structures. The combine operation may use the new or updated four-hop path structure and existing combined four-hop path for the same currency pair as the new or updated four-hop path structure.

This may be repeated for five-hop paths and six-hop paths in a similar manner, up to any maximum path length used by the path finding system.

The path finding system may execute a separate thread for each path length, with each thread responsible for performing the join and combine operations to keep the path structures updated in the persistent data structure for its path length as new or updated path structures are written into ring buffers read by each thread. The ring buffers may be used to hold data to be passed between execution threads responsible for performing the join and combine operations and maintaining the path structures of each length. For example, there may be a single ring buffer for each path length except for longest path length. When a thread executing a combine operation at a specific path length determines that a new or updated path structure with paths of the specific path length is important enough for the new combined path structure to be used to generate paths of the next length, the thread may copy the new combined path structure to the next available location in a ring buffer associated with a thread responsible for path structures with paths of the next length. The new combined path structure may be read from the ring buffer by the thread responsible for the path structures of the next path length. The writing and reading to the ring buffer may be asynchronous, with a thread for one path length writing to ring buffer as new combined path structures are determined to be important, and the thread for the next path length reading a new combined path structure from the ring buffer whenever it is not busy, such as, for example, after the thread completes join and combine operations with a combined path structure previously read from the ring buffer. This may allow all the threads to operate asynchronously and concurrently, so that a thread that generates a multi-hop path may do so with any new combined path structure from its respective ring buffer while threads that generate shorter paths also operate on new combined path structures from their ring buffers. A thread's ring buffer may be written to while the thread is operating on a new combined path structure read from the ring buffer, so that when then the thread is finished, there may be more new combined path structures for the thread to operate on, thus reducing the amount of time any thread may remain idle and allowing for the computer to efficiently generate multi-hop paths based on new or updated orders.

In some implementations, the path finding system may join multi-hop path structures with other multi-hop path structures when generating paths of different lengths. For example, the path finding system may join a first two-hop path structure for a currency pair with a second two-hop path structure for a different currency pair to create a four-hop path structure for a currency pair with a starting currency that is the starting currency of the first two-hop path structure and an ending currency that is the ending currency of the second two-hop path structure.

The path finding system may respond to requests for paths by looking up and returning suitable paths of any length. A request may include a starting currency and an ending currency. A request may also include a volume. The path finding system may retrieve paths from the combined path structures for the requested currency pair at each length of the path. If the request includes a volume, the path finding system may be able to determine the optimal paths for the requested volume based on the price levels and volumes of the paths from the path combined structures for the requested currency pair. The retrieval of paths from the path structures may be accomplished in parallel, as the persistent data structures for each path length may be separate and accessible in parallel.

Communication between computing devices and systems, such as the exchanges and the path finding system may occur directly, or may be routed in any suitable manner. Communications may occur directly using any suitable communications protocols, such as, for example, HTTPS. In some implementations, instead of messages being sent by one computing device or system to another, a computing device or system may check for a message on another computing device or system. Computing devices and system may communicate using any suitable communications hardware, including, for example, any suitable wired and wireless network adapters.

FIG. 1 shows an example system suitable for multi-hop path finding according to an implementation of the disclosed subject matter. A path finding computing device 100 may include a path finder 110, a path retriever 120, and a storage 140. The path finding computing device 100 may be any suitable computing device, such as, for example, a computer 20 as described in FIG. 7, or component thereof, for implementing the path finder 110, the path retriever 120, exchange adapters 150, and the storage 140. The path finding computing device 100 may be a single computing device, or may include multiple connected computing devices, and may be, for example, a laptop, a desktop, an individual server, a server farm, or a distributed server system, or may be a virtual computing device or system. The path finding computing device 100 may be part of a computing system and network infrastructure, or may be otherwise connected to the computing system and network infrastructure. The path finder 110 may be any suitable combination of hardware and software on the path finding computing device 100 for generating paths between currency pairs based on orders made available by exchange computing devices in a currency exchange network. The path retriever 120 may be any suitable combination of hardware and software on the path finding computing device 100 for searching paths generated by the path finder 110. The exchange adapters 150 may be any suitable combination of hardware and software on the path finding computing device 100 for receiving and evaluating new and updated orders, individually or as order books, from exchanges. The storage 140 may be any suitable hardware storage with any suitable software on, or accessible to, the path finding computing device 100, and may store path structure data 142 and ring buffers 143.

The path finder 110 may be any suitable combination of hardware and software on the path finding computing device 100 for generating paths between currency pairs based on orders made available by exchange computing devices in a currency exchange network. The path finder 110 may be multi-threaded, with, for example, one thread for each path length stored in the path structure data 142. Threads of the path finder 110 may run concurrently or in parallel based on available processors. The path finder 110 may perform join and combine operations, starting with orders received from exchange computing devices, to generate paths of the various lengths. A thread of the path finder 110 may determine the relative importance of new or updated path structures using a combine operation, and may write new combined path structures to the ring buffers 143. Data, which may include any number of new combined path structures, written by a thread of the path finder 110 responsible for a path length to one of the ring buffers 143, may be read by the thread of the path finder 110 responsible for the next path length. This thread may perform join operations using the new combined path structures to generate path structures with paths of the length for which the thread is responsible. The thread may then perform a combine operation using the generated new or updated path structure. If the new or updated path structure is determined to be important enough, the thread may write the combined path structure resulting from the combine operation to another of the ring buffers 143, where it may be read by the thread responsible for the next path length. The threads of the path finder 110 may operate asynchronously, reading from and writing to the ring buffers 143 as necessary. The combined path structures resulting from combine operations performed by the threads of the path finder 110 may be written to the path structure data 142, which may include persistent data structures that may store the combined path structures for each path length. All of threads of the path finder 110 may run in a single-address space, for example, in volatile memory of the path finding computing device 100. Data structures used by the path finder 110 may be stored in the single address space.

The path retriever 120 may be any suitable combination of hardware and software on the path finding computing device 100 for searching paths generated by the path finder 110. The path finding computing device 100 may receive a request, which may include a starting currency and an ending currency. A request may also include a volume. The path retriever 110 may retrieve paths from the combined path structures stored in the path data structures 142 for the requested currency pair at each possible length of the path. If the request includes a volume, the path retriever 110 may be able to determine the optimal paths for the requested volume based on the price levels and volumes of the paths from the combined path structures in the path structure data 142 for the requested currency pair. The retrieval of paths from the combined path structures may be accomplished in parallel, as the persistent data structures of the path structure data 142 in which the combined path structures are stored for each path length may be separate and accessible in parallel.

The storage 140 may be any suitable hardware storage with any suitable software on, or accessible to, the path finding computing device 100, and may store an asynchronous channel 141, path structure data 142, and ring buffers 143. For example, the storage 140 may be any combination of volatile memory and non-volatile, which may allow for low-latency access to the path structure data 142 and the ring buffers 143. For example, the storage 140 may be volatile memory of the path finding computing device 100 with a single address space. The storage 140 may store the path structure data 142, which may include persistent data structures for paths of different lengths into which the threads of the path finder 110 may write combined path structures generated through combine operations. The path structure data 142 may be stored in persistent data structures stored in any suitable combination of volatile and non-volatile memory. The path structures stored in the path structure data 142 may be stored as part of a persistent data structure which may be immutable, and may be persistently available and lockless, so that they may be accessed as necessary by the path retriever 120. The storage 140 may store the ring buffers 143, which may be ring buffers stored in any suitable combination of volatile and non-volatile memory. The ring buffers may store new or updated one-hop path structures which may be written and retrieved by the threads of the path finder 110.

The exchange adapters 150 may be any suitable combination of hardware and software on the path finding computing device 100 for receiving and evaluating new and updated orders, individually or as order books, from exchanges. The exchange adapters 150 may receive individual new or updated orders from exchanges, or may receive entire order books that include all the orders from an exchange. The exchange adapters 150 may determine which of the orders in the order book are new or updated. The exchange adapters 150 may control the flow of data about new or updated orders from the exchanges to the path finder 110 using the set point in its evaluation of the importance of new or updated orders.

Figure 2:
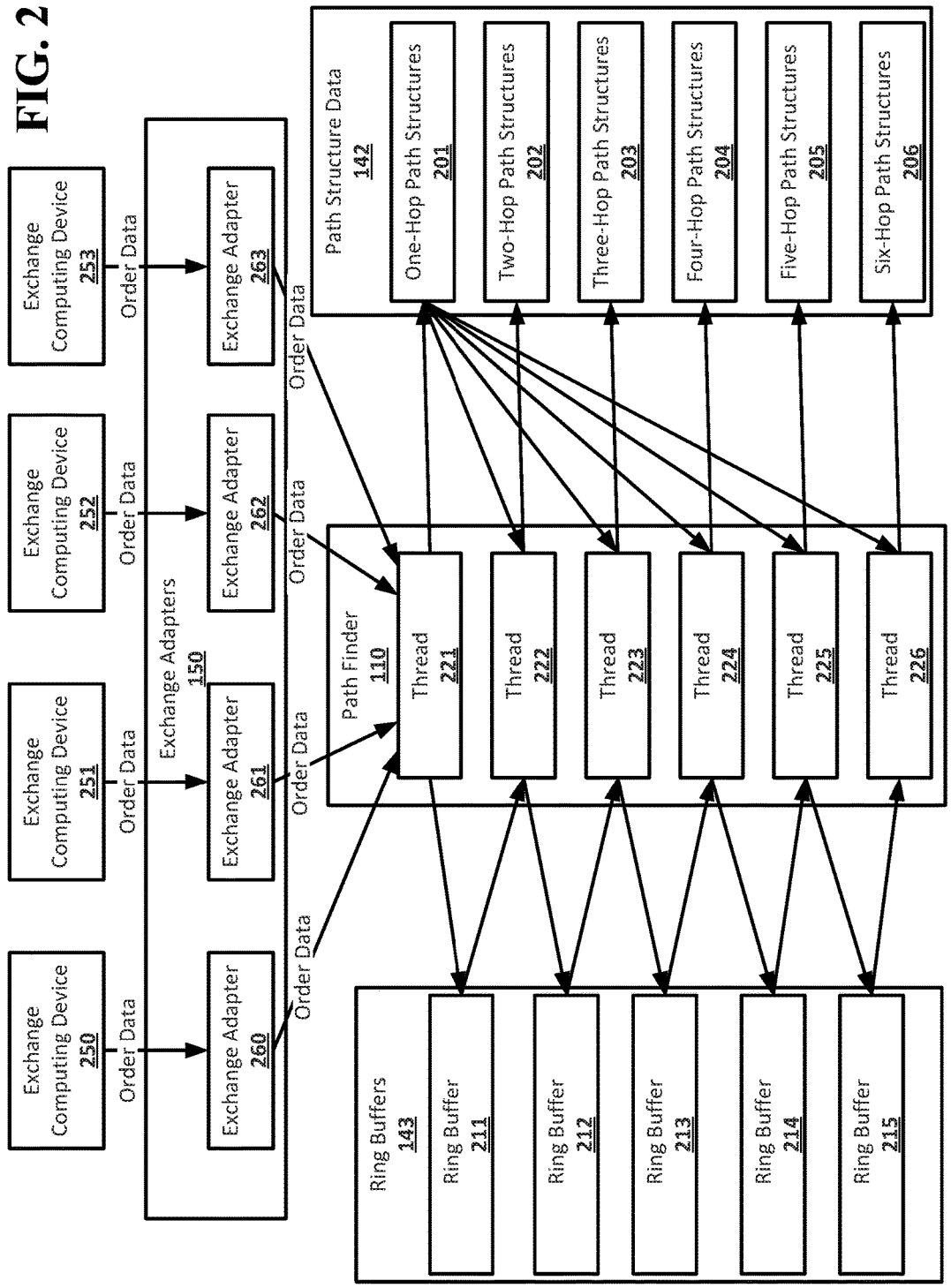
FIG. 2 shows an example system suitable for multi-hop path finding according to an implementation of the disclosed subject matter.

FIG. 2 shows an example system suitable for multi-hop path finding according to an implementation of the disclosed subject matter. A currency exchange network may include any number of exchange computing devices, such as the exchange computing devices 250, 251, 252, and 253. The exchange computing devices 250, 251, 252, and 253 may be any suitable computing devices for an exchange that may operate within a currency exchange network, and may be, for example, desktop or laptop computers, server systems, or virtual or hosted systems. The exchange computing devices 250, 251, 252, and 253 may include orders, which may include a currency pair with a starting currency and ending currency, a price level, which may be an exchange rate, and volume, which may be the amount of the starting currency that can be exchanged for the ending currency at the exchange rate. Orders may be created on the exchange computing devices 250, 251, 252, and 253 in any suitable manner. For example, orders may be received from other computing devices connected to the exchange computing devices 250, 251, 252, and 253 through any suitable communications network or may be generated on the exchange computing devices 250, 251, 252, and 253. When a new order is made available, or an existing order is updated, on an exchange computing device, such as the exchange computing devices 250, 251, 252, and 253, the new or updated order may be sent to one of the exchange adapters 150. The exchange adapters 150 of the path finding computing device 100 may include a separate exchange adapter for each of the exchange computing devices. For example, the exchange adapters 150 may include an exchange adapter 260 which may receive orders from the exchange computing device 250, an exchange adapter 261 which may receive orders from the exchange computing device 251, an exchange adapter 262 which may receive orders from the exchange computing device 252, and an exchange adapter 263 which may receive orders from the exchange computing device 253.

New or updated orders received at any of the exchange adapters 150 may be evaluated according (1) to determine whether the order is important enough to send data about the order to the path finder 110 of the path finding computing device 100. If the order is not important enough for data about the order to be sent to the path finder 110, the order may remain available on the exchange computing device, but no data about the order may be sent to the path finder 110 from the exchange adapters 150. If the order is important enough for data about the order to be sent to the path finding computing device 100, the exchange computing device may transmit data about the order, including the currency pair, exchange rate, and volume of the order, to the path finding computing device 100. The data about the order may also include the identity of the exchange computing device from which the new or updated order was received. The order may remain available on the exchange computing device.

Data about an order, or order data, from any of the exchange computing devices 250, 251, 252, and 253 may be received by the path finder 110 after being passed on by any off the exchange adapters 260, 261, 262, and 263. The order data may be processed by a thread 221 of the path finder 110. The thread 221 of the path finder 110 may be a thread of execution which may be responsible for one-hop paths, and may maintain a persistent data structure for one-hop path structures 201. The thread 221 may add an order described in newly received order data together with any already existing orders from the same exchange, as stored as part of the one-hop path structures 201, with the same currency pair and exchange rate to form a one-hop path. The thread 221 may then perform a combine operation to combine any one-hop paths that are for the same currency pair into combined one-hop path structures, which may be stored in the persistent data structure for the one-hop path structures 201. This may include updating an already existing one-hop path structure by adding a new one-hop path based on newly received order data, updating a one-hop path already in a one-hop path structure when orders from the same exchange with the same currency pair and exchange rate are combined, or creating a new combined one-hop path structure when no existing one-hop path structure is for the same currency pair as the one-hop path. The combined one-hop path structure for a currency pair may include any number of one-hop paths, which may include orders from any exchange, including orders from the same exchange which have been added together, ordered by price level. The combine operation may also evaluate the importance of the new or updated one-hop path used to generate the combined one-hop path structure.

For example, order data for an order from the exchange computing device 250 may be received at the exchange adapters 150 of the path finding computing device 100. The order data may describe an order with a starting currency of USD, an ending currency of EUR, an exchange rate of 0.80, and a volume of 100,000. The thread 221 may determine that, stored in the one-hop path structures 201, there is a one-hop path based on a previous order from the exchange computing device 250 with a starting currency of USD, an ending currency of EUR, an exchange rate of 0.80, and a volume of 50,000. The thread 221 may add the new order and the previous order together to generate a one-hop path with a starting currency of USD, an ending currency of EUR, an exchange rate of 0.80, and a volume of 150,000. The thread 221 may then perform a combine operation using this one-hop path to generate a combined one-hop path structure that includes any other one-hop paths with a starting currency of USD and an ending currency EUR. The combined one-hop path structure may include all such one-hop paths based any order data received by the path finding computing device 100 from any of the exchange computing devices 250, 251, 252, and 253, at any time, as long, as the one-hop paths are still current, for example, having not had the orders they were based on deleted from their exchange computing device of origin. The combined one-hop path structure may be ordered by price level.

The thread 221 may write combined one-hop path structures to ring buffer 211 of the ring buffers 143. The ring buffer 211 may be any suitable data structure stored in any suitable memory of the path finding computing device 100 for implementing any suitable type or variation of a ring buffer. The thread 221 may write new combined one-hop path structures to the ring buffer 211 as the new combined one-hop path structures become available to be written.

A thread 222 of the path finder 110 may read new combined one-hop path structures from the ring buffer 211. The thread 222 may be a thread of execution which may be responsible for two-hop paths, and may maintain a persistent data structure for two-hop path structures 202. The thread 222 may perform join operations using the new combined one-hop path structure read from the ring buffer 211 and the combined one-hop path structures for other currency pairs stored in the persistent data structure for the one-hop path structures 201. The join operations may generate two-hop path structures. The new combined one-hop path structure read from the ring buffer 211 may be used on either the left or right-hand side of a join operation, acting as the first or second hop in a two-hop path. This may allow for the generation of two-hop paths that start with the starting currency of the new or updated one-hop path structure or end with the ending currency of the new or updated one-hop path structure. The thread 222 may generate any suitable number of two-hop path structures using the new combined one-hop path structure. For example, the thread 222 may generate all two-hop path structures made possible by the new combined one-hop path structure.

The thread 222 may perform a combine operation using each of the new or updated two-hop path structures generated by the join operation. The combine operation may combine a new or updated two-hop path structure with an already existing combined two-hop path structure that is for the same currency pair as the new or updated two-hop path structure. The combine operation may determine if the new or updated two-hop path structure is important enough for the new combined two-hop path structure generated by the combine operation to be written to a ring buffer 212, where it may be read by a thread 223, which may be a thread of execution of the path finder 110 which may be responsible for three-hop paths, and may maintain a persistent data structure for three-hop path structures 203. The importance of the new or updated two-hop path structure may be determined according to (2), and may be compared to a function of the set point and path length of three for which the thread 223 is responsible. The new combined two-hop path structure generated by the combine operation may be stored in the persistent data structure for two-hop path structures 202. If the new or updated two-hop path structure is determined to not be important enough to write the new combined two-hop path structure to the ring buffer 212, the thread 222 may not write the new combined two-hop path structure to the ring buffer 212 and may proceed with other operations, such as performing another join operation using the new combined one-hop path structure that was read from the ring buffer 211 to generate another new or updated two-hop path structure, performing another combine operation using another generated new or updated two-hop path structure, or reading another new combined one-hop path structure from the ring buffer 211. This may result in the new combined two-hop path structure that was not written to the ring buffer 212 not being used to generate paths with three hops.

The thread 223 of the path finder 110 may read new combined two-hop path structures from the ring buffer 212. The thread 223 may perform join operations using a new combined two-hop path structure read from the ring buffer 212 and the combined one-hop path structures stored in the persistent data structure for the one-hop path structures 201. The join operations may generate three-hop path structures. The thread 223 may generate a three-hop path structure with the new combined two-hop path structure and the combined one-hop path structures by performing a join operation with the combined two-hop path structure on either the left or right-hand side. The two-hop paths in the new combined two-hop path structure may thus be either the first two hops or the last two hops in the three-hop paths included in the new or updated three-hop path structure generated by the join operation. The thread 223 may generate any suitable number of three-hop path structures using the new combined two-hop path structure. For example, the thread 223 may generate all three-hop path structures made possible by the new combined two-hop path structure.

After generating a three-hop path structure using the join operation, the thread 223 may perform a combine operation using the generated new or updated three-hop path structure. The combine operation may combine the new or updated three-hop path structure with an already existing combined three-hop path structure that is for the same currency pair as the new or updated three-hop path structure. The combine operation may determine if the new or updated three-hop path structure is important enough for the new combined three-hop path structure generated by the combine operation to be written to a ring buffer 213, where it may be read by a thread 224, which may be a thread of execution of the path finder 110 which may be responsible for four-hop paths, and may maintain a persistent data structure for four-hop path structures 204. The importance of the new or updated three-hop path structure may be determined according to (2), and may be compared to a function of the set point and path length of four for which the thread 224 is responsible. The new combined three-hop path structure generated by the combine operation may be stored in the persistent data structure for three-hop path structures 203. If the new or updated three-hop path structure is determined to not be important enough to write to the ring buffer 213, the thread 223 may not write the combined three-hop path structure to the ring buffer 213 and may proceed with other operations, such as performing another join operation using the combined two-hop path structure that was read from the ring buffer 212 to generate another new or updated three-hop path structure, performing another combine operation using another generated new or updated three-hop path structure, or reading another new combined two-hop path structure from the ring buffer 212. This may result in the new combined three-hop path structure that was not written to the ring buffer 213 not being used to generate paths with four hops.

The thread 224 of the path finder 110 may read new combined three-hop path structures from the ring buffer 213. The thread 224 may perform join operations using a new combined three-hop path structure read from the ring buffer 213 and the combined one-hop path structures stored in the persistent data structure for the one-hop path structures 201. The join operations may generate four-hop path structures. The thread 224 may generate a four-hop path structure with the new combined three-hop path structure and the combined one-hop path structures by performing a join operation with the new combined three-hop path structure on either the left or right-hand side. The three-hop paths in the new combined three-hop path structure may thus be either the first three hops or the last three hops in the four-hop paths included in the new or updated four-hop path structure generated by the join operation. The thread 224 may generate any suitable number of four-hop path structures using the new combined three-hop path structure. For example, the thread 224 may generate all four-hop path structures made possible by the new combined three-hop path structure.

After generating a four-hop path structure using the join operation, the thread 224 may perform a combine operation using the generated new or updated four-hop path structure. The combine operation may combine the new or updated four-hop path structure with an already existing combined four-hop path structure for the same currency pair as the new or updated four-hop path structure. The combine operation may determine if the new or updated four-hop path structure is important enough for the new combined four-hop path structure to be written to a ring buffer 214, where it may be read by a thread 225, which may be a thread of execution of the path finder 110 which may be responsible for five-hop paths, and may maintain a persistent data structure for five-hop path structures 205. The importance of the new or updated four-hop path structure may be determined according to (2), and may be compared to a function of the set point and path length of five for which the thread 225 is responsible. The new combined four-hop path structure generated by the combine operation may be stored in the persistent data structure for four-hop path structures 204. If the new or updated four-hop path structure is determined to not be important enough to write the new combined four-hop path structure to the ring buffer 214, the thread 224 may not write the new combined four-hop path structure to the ring buffer 214 and may proceed with other operations, such as performing another join operation using the new combined three-hop path structure that was read from the ring buffer 213 to generate another new or updated four-hop path structure, performing another combine operation using another generated new or updated four-hop path structure, or reading another new combined three-hop path structure from the ring buffer 213. This may result in the new combined four-hop path structure that was not written to the ring buffer 214 not being used to generate paths with five hops.

The thread 225 of the path finder 110 may read new combined four-hop path structures from the ring buffer 214. The thread 225 may perform join operations using the new combined four-hop path structure read from the ring buffer 214 and the combined one-hop path structures stored in the persistent data structure for the one-hop path structures 201. The join operations may generate five-hop path structures. The thread 225 may generate a five-hop path structure with the new combined four-hop path structure and the combined one-hop path structures by performing a join operation with the new combined four-hop path structure on either the left or right-hand side. The four-hop paths in the new combined four-hop path structure may thus be either the first four hops or the last four hops in the five-hop paths included in the new or updated five-hop path structure generated by the join operation. The thread 225 may generate any suitable number of five-hop path structures using the new combined four-hop path structure. For example, the thread 225 may generate all five-hop path structures made possible by the new combined four-hop path structure.

After generating a five-hop path structure using the join operation, the thread 225 may perform a combine operation using the new or updated five-hop path structure. The combine operation may combine the new or updated five-hop path structure with an already existing combined five-hop path structure for the same currency pair as the new or updated five-hop path structure. The combine operation may determine if the new or updated five-hop path structure is important enough for the new combined five-hop path structure to be written to a ring buffer 215, where it may be read by a thread 226, which may be a thread of execution of the path finder 110 which may be responsible for six-hop paths, and may maintain a persistent data structure for six-hop path structures 206. The importance of the new or updated five-hop path structure may be determined according to (2), and may be compared to a function of the set point and path length of six for which the thread 226 is responsible. The new combined five-hop path structure generated by the combine operation may be stored in the persistent data structure for five-hop path structures 205. If the new or updated five-hop path structure is determined to not be important enough to write the new combined five-hop path structure to the ring buffer 215, the thread 225 may not write the new combined five-hop path structure to the ring buffer 215 and may proceed with other operations, such as performing another join operation using the new combined four-hop path structure that was read from the ring buffer 214 to generate another new or updated five-hop path structure, performing another combine operation using another generated new or updated five-hop path structure, or reading another new combined four-hop path structure from the ring buffer 214. This may result in the new combined five-hop path structure that was not written to the ring buffer 215 not being used to generate paths of any length longer five hops.

The thread 226 of the path finder 110 may read new combined five-hop path structures from the ring buffer 215. The thread 226 may perform join operations using the new combined five-hop path structure read from the ring buffer 215 and the combined one-hop path structures stored in the persistent data structure for the one-hop path structures 201. The join operations may generate six-hop path structures. The thread 226 may generate a six-hop path structure with the new combined five-hop path structure and the combined one-hop path structures by performing a join operation with the new combined five-hop path structure on either the left or right-hand side. The five-hop paths in the new combined five-hop path structure may thus be either the first five hops or the last five hops in the six-hop paths included in the new or updated six-hop path structure generated by the join operation. The thread 226 may generate any suitable number of six-hop path structures using the new combined five-hop path structure. For example, the thread 226 may generate all six-hop path structures made possible by the new combined five-hop path structure.

If, for example, the path finder 110 is configured to only generate paths with up to six hops, the thread 226 may perform a combine operation to generate a new combined six-hop path structure using the new or updated six-hop path structure and an already existing combined six-hop path structure for the same currency pair, but may not need to determine the relative importance of the new or updated six-hop path structure, as there may be no thread responsible for a path with a longer length to which new or updated six-hop path structures may be passed. Otherwise, the path finder 110 may repeat performing a combine operation, writing the new combined path structure to a ring buffer as necessary, and performing join operations to form path structures with longer paths up to any suitable path length. Each path length may have its own thread of execution in the path finder 110 and its own persistent data structure the path structure data 142 in which to store generated combined path structures. All threads of the path finder 110 may operate asynchronously, writing to ring buffers 143 as new combined path structures are available to write, regardless of the status of the thread of execution that will read from the written-to ring buffer, and reading from the ring buffers 143 when processing time is available to perform join and combine operations, regardless of the status of any other thread. For example, the thread 223 may perform a join operation on one new combined two-hop path structure while the thread 225 performs a combine operation on a new combined four-hop path structure.

The performance of combine operations, and determination of the importance of a new or updated path structure, by each thread of the path finder 110 may improve machine efficiency by limiting the computational power used to generate longer paths. Longer path lengths may take longer to generate due to combinatorial explosion, and generating a large number of longer path lengths may cause the generated multi-hop paths to be outdated, or otherwise no longer useful, by the time they are generated. Because the threshold for importance increases as the path length increases, the thread 226 not receive exponentially more new combined five-hop path structures than the thread 225 receives new combined four-hop path structures, and the thread 225 may not receive exponentially more new combined four-hop path structures than the thread 224 receives new combined three-hop path structures, and so on. Only new combined five-hop paths based on new or updated five-hop path structures determined to be important may be used to generate six-hop path structures, with six-hop paths, allowing important six-hop paths to be generated in a timely manner without requiring excessive computational power. Such aspects of embodiments enable a computer system to effectively calculate longer paths using less computational power. Increasing the set point as the latency of the performance of the combine operation that generates combined one-hop path structures increases may also help reduce the latency of the generation of paths of all lengths, as data about fewer orders may be received by the path finder 110 from the exchange adapters 260, 261, 262, and 263 when the amount of time needed for the thread 221 to process a new or updated order and generate new combined one-hop path structures increases due to a backlog of new or updated orders. Increasing the set point may also decrease the number of new combined path structures passed on to ring buffers read by threads responsible for longer path lengths, further reducing the latency in the generation of paths for longer path lengths by ensuring that backlogs of new combined path structures don't build up in the ring buffers, such as the ring buffers 212, 213, 214, and 215. The computer system is thereby improved by such aspects by reducing its latency.

FIG. 3A shows an example join operation suitable for multi-hop path finding according to an implementation of the disclosed subject matter. A join operation may join two path structures together into a path structure with paths having a number of hops equal to the total number of hops in both joined path structures. One of the path structures in a join operation, such as the path structure 301, may be on the left-hand side of the join operation, and the other path structure, such as the path structure 302, may be on the right-hand side of the join operation.

The path structure 301 may be a combined one-hop path structure, and may include one-hop paths 310, 311, 312, and 313 which may have the currency pair USD/EUR, different price levels, or exchange rates, and different volumes. The single one-hop paths 310, 311, 312, and 313 may be ordered by price level within the path structure 301, with the one-hop path 310 having the best, or cheapest exchange rate, and the one-hop path 313 have the worst, or most expensive, exchange rate. The one-hop path 310 may have the largest volume of the one-hop paths 310, 311, 312, and 313.

The path structure 302 may be a combined one-hop path structure, and may include one-hop paths 320, 321, and 322 which may have the currency pair EUR/GBP, different price levels, or exchange rates, and different volumes. The single one-hop paths 320, 321, and 322 may be ordered by price level within the path structure 302, with the one-hop path 320 having the best, or cheapest exchange rate, and the one-hop path 322 have the worst, or most expensive, exchange rate. The one-hop path 321 may have the largest volume of the one-hop paths 320, 321, and 322. The volumes of the one-hop paths 320, 321, and 322 may be converted to be expressed in terms of USD so that they may be aligned with the volumes of the one-hop paths 310, 311, 312, and 313.

FIG. 3B shows an example join operation suitable for multi-hop path finding according to an implementation of the disclosed subject matter. The join operation may select the one-hop paths at the first, or best, price levels available in the path structures 301 and 302. The one-hop path 310 may be at the first price level in the path structure 301, and the one-hop path 320 may be at the first price level in the path structure 302. The join operation may join the one-hop path 320 to the one-hop path 310, forming a partial path structure 303 with a two-hop path that goes from USD to EUR using the single hop-path 310 and then from EUR to GBP using the one-hop path 320. The volume of the one-hop path 320 may be smaller than the volume of the one-hop path 310, leaving a portion 304 of the one-hop path 310 uncovered. The portion 304 may represent the portion of the volume of the of the one-hop path 310 not used by the two-hop path formed from the one-hop path 310 and the one-hop path 320.

FIG. 3C shows an example join operation suitable for multi-hop path finding according to an implementation of the disclosed subject matter. The join operation may determine that there are one-hop paths in both the path structure 301 and the path structure 302 that have not been used. Because the partial path structure 303 includes the uncovered portion 304 from the one-hop path 310 from the path structure 301, the join operation may select the one-hop path at the next price level in the path structure 302. This may be the one-hop path 321. The one-hop path 321 may be joined to the portion 304, covering it and adding to the partial path structure 303 another two-hop path that goes from USD to EUR using the portion 304 of single hop-path 310 and then from EUR to GBP using the one-hop path 321. The volume of the one-hop path 321 may be larger than the volume of the portion 304 of the one-hop path 310, leaving a portion 305 of the one-hop path 321 uncovered. The portion 305 may represent the portion of the volume of the of the one-hop path 321 not used by the two-hop path formed from the portion 304 of the one-hop path 310 and the one-hop path 321.

FIG. 3D shows an example join operation suitable for multi-hop path finding according to an implementation of the disclosed subject matter. The join operation may determine that there are one-hop paths in both the path structure 301 and the path structure 302 that have not been used. Because the partial path structure 303 includes the uncovered portion 305 from the one-hop path 321 from the path structure 302, the join operation may select the one-hop path at the next price level in the path structure 301. This may be the one-hop path 311. The one-hop path 311 may be joined to the portion 305, covering it and adding to the partial path structure 303 another two-hop path that goes from USD to EUR using the single hop-path 311 and then from EUR to GBP using the portion 305 of the one-hop path 321. The volume of the one-hop path 311 may be larger than the volume of the portion 305 of the one-hop path 321, leaving a portion 306 of the one-hop path 311 uncovered. The portion 306 may represent the portion of the volume of the of the one-hop path 311 not used by the two-hop path formed from the one-hop path 311 and the portion 305 of the one-hop path 321.

Figure 3E:
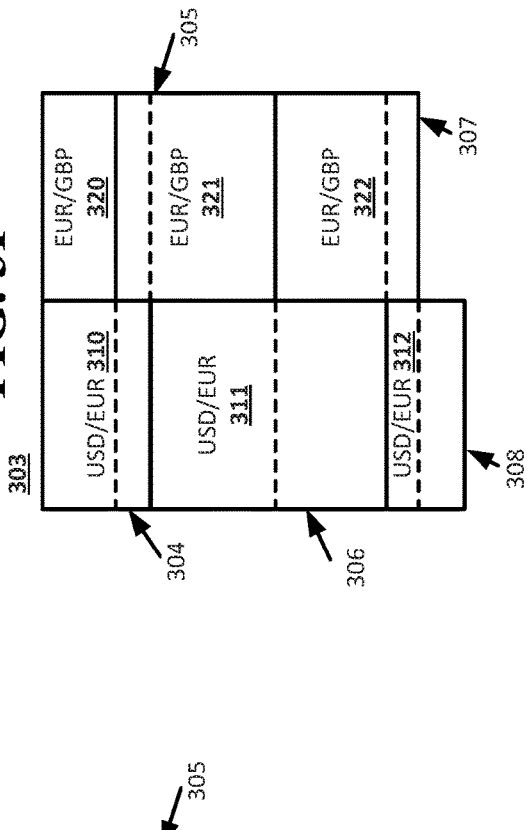
FIG. 3E shows an example join operation suitable for multi-hop path finding according to an implementation of the disclosed subject matter.

FIG. 3E shows an example join operation suitable for multi-hop path finding according to an implementation of the disclosed subject matter. The join operation may determine that there are one-hop paths in both the path structure 301 and the path structure 302 that have not been used. Because the partial path structure 303 includes the uncovered portion 306 from the one-hop path 311 from the path structure 301, the join operation may select the one-hop path at the next price level in the path structure 302. This may be the one-hop path 322. The one-hop path 322 may be joined to the portion 306, covering it and adding to the partial path structure 303 another two-hop path that goes from USD to EUR using the portion 306 of single hop-path 311 and then from EUR to GBP using the one-hop path 322. The volume of the one-hop path 322 may be larger than the volume of the portion 306 of the one-hop path 311, leaving a portion 307 of the one-hop path 322 uncovered. The portion 307 may represent the portion of the volume of the of the one-hop path 322 not used by the two-hop path formed from the portion 306 of the one-hop path 311 and the one-hop path 322.

Figure 3F:
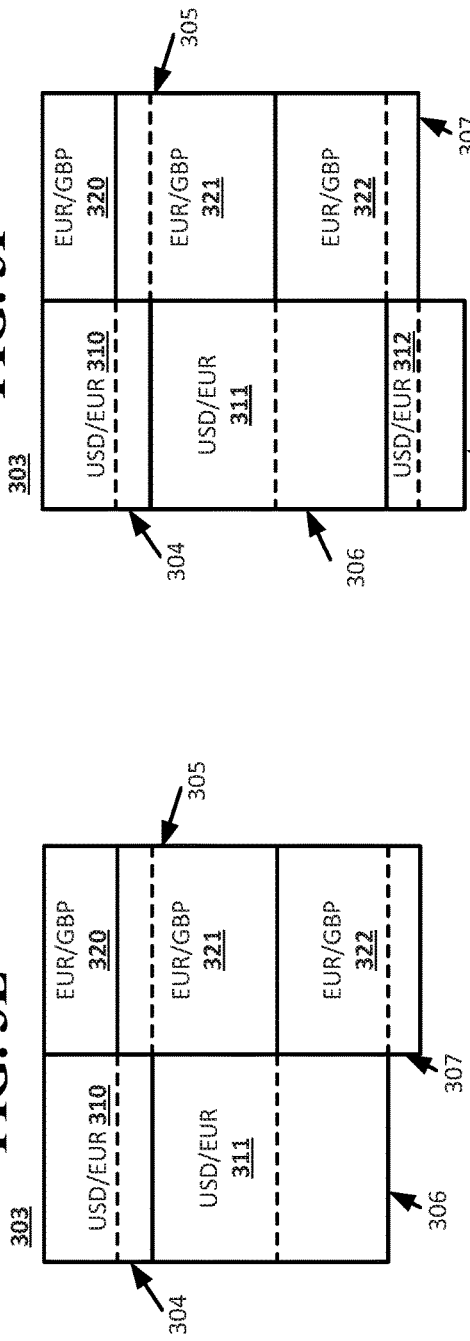
FIG. 3F shows an example join operation suitable for multi-hop path finding according to an implementation of the disclosed subject matter.

FIG. 3F shows an example join operation suitable for multi-hop path finding according to an implementation of the disclosed subject matter. The join operation may determine that there are one-hop paths in both the path structure 301 and the path structure 302 that have not been used. Because the partial path structure 303 includes the uncovered portion 307 from the one-hop path 322 from the path structure 302, the join operation may select the one-hop path at the next price level in the path structure 301. This may be the one-hop path 312. The one-hop path 312 may be joined to the portion 307, covering it and adding to the partial path structure 303 another two-hop path that goes from USD to EUR using the single hop-path 312 and then from EUR to GBP using the portion 307 of the one-hop path 322. The volume of the one-hop path 312 may be larger than the volume of the portion 307 of the one-hop path 322, leaving a portion 308 of the one-hop path 312 uncovered. The portion 308 may represent the portion of the volume of the of the one-hop path 312 not used by the two-hop path formed from the one-hop path 312 and the portion 307 of the one-hop path 322.

Figure 3G:
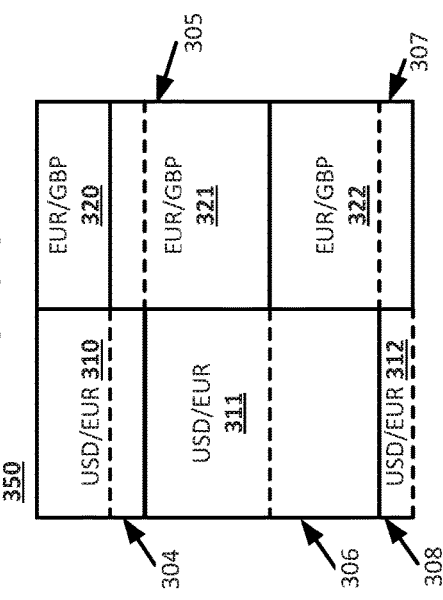
FIG. 3G shows an example join operation suitable for multi-hop path finding according to an implementation of the disclosed subject matter.

FIG. 3G shows an example join operation suitable for multi-hop path finding according to an implementation of the disclosed subject matter. The join operation may determine that there are no one-hop paths in the path structure 302 that have not been used. All of the one-hop paths at all price levels from the path structure 302 may already be incorporated into the partial path structure 303. There may be no one-hop path form the path structure 302 available to cover the portion 308 of the one-hop path 312. The join operation may complete by removing the portion 308 from the partial path structure 303, resulting in the two-hop path structure 350. The two-hop path structure 350 may include four separate two-hop paths, ordered by price level, for converting USD to GBP through EUR. Each two-hop path may use all or a portion of a one-hop path from the path structures 301 and 302, and each one-hop path may represent an order available on an exchange computing device in a currency exchange network.

The path structures used on the left-hand side and right-hand side of a join operation may include paths with any suitable number of hops. For example, the threads of the path finder 110 may perform join operations using one-hop path structures on either the left-hand or right-hand side, and a path structure with paths that have one fewer hop than the paths the thread is responsible for on the other side. This may allow each thread to extend the paths in the path structures it reads from its associated ring buffer by one hop to generate new path structures. For example, a one-hop path structure with the currency pair GBP/Yen may be used as the right-hand side of a join operation with the path structure 350 to generate a three-hop path structure that goes from USD to Yen through EUR and GBP. Similarly, a one-hop path structure with the currency pair Yen/USD may be used as the left-hand side of a join operation with the path structure 350 to generate a three-hop path structure that goes from Yen to GBP through USD and EUR. When a two-hop path structure, such as the two-hop path structure 350, is used in a join operation, the two-hop paths may be treated in the same manner as the one-hop paths are treated during a join operation.

Figure 4A:
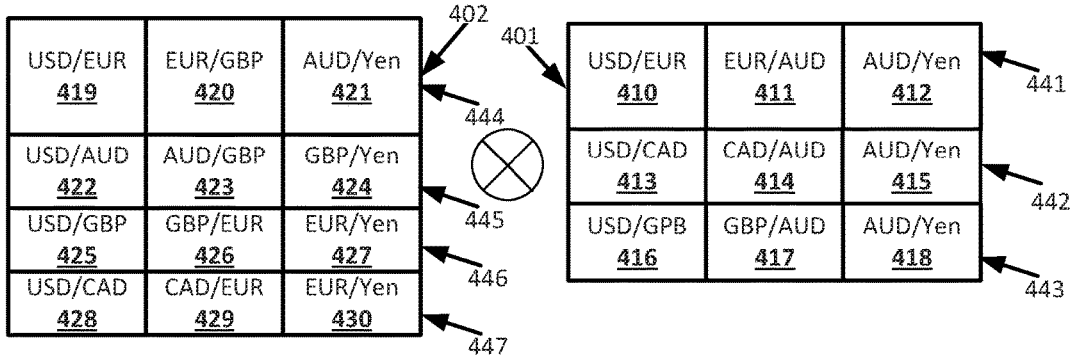
FIG. 4A shows an example combine operation suitable for multi-hop path finding according to an implementation of the disclosed subject matter.

FIG. 4A shows an example combine operation suitable for multi-hop path finding according to an implementation of the disclosed subject matter. A combine operation may combine two path structures with path of the same length together into a path with paths ordered by price level. One of the path structures in a combine operation, such as the path structure 401, may be on the right-hand side of the combine operation, and the other path structure, such as the path structure 402, may be on the left-hand side of the combine operation. The combine operation may be performed by, for example, the thread 223. The path structure 401 may be a new or updated three-hop path structure generated by a join operation performed by the thread 223. The path structure on the right-hand side of a combine operation may be the path structure whose importance is evaluated using the combine operation. The number of hops in the path of the path structure on the right-hand side of the combine operation may be based on the thread of the path finder 110 that is performing the combine operation. The path structure 402 may be, for example, a combined three-hop path structure for the same currency pair as the path structure 401. The path structure on the left-hand side of a combine operation may include all paths of the same length as and for the same currency pair as the path structure on the right-hand side. For example, the left-hand side of a combine operation performed by the thread 223 may be a combine three-hop path structure generated by the thread 223 and stored in the persistent data structure for three-hop path structures 203.

The path structure 401 may include paths of the same length for the same currency pair. For example, the path structure 401 may be a three-hop path structure for the currency pair USD/Yen. The path structure 401 may include three-hop paths 441, 442, and 443. Each of the three-hop paths 441, 442, and 443 may be for the same currency pair, for example, USD/Yen. The last hops of the three-hop paths 441, 442, and 442 may have the same currency pair, AUD/Yen, which may be the result of the joining of a combined two-hop path structure for the currency pair USD/AUD with a combined one-hop path structure for the currency pair AUD/Yen. The three-hop path 441 may go from USD to EUR in hop 410, from EUR to AUD in hop 411, and from AUD to Yen in hop 412. The three-hop path 442 may go from USD to CAD in hop 413, from CAD to AUD in hop 414, and from AUD to Yen in hop 415. The three-hop path 443 and may go from USD to GBP in hop 416, GBP to AUD in hop 417, and AUD to Yen in hop 418. The three-hop paths 441, 442, and 443 may be ordered by price level. The hops 410, 411, 412, 413, 414, 415, 416, 417, and 418 may correspond to whole one-hop paths, multiple whole one-hop paths, or portions of one-hop paths from the one-hop path structures, based on how the paths were generated through join operations.

The path structure 402 may be a three-hop path structure, and may be, for example, a combined three-hop path structure stored in the persistent data structure for three-hop path structures 203. The path structure 402 may include three-hop paths 444, 445, 446, and 447 for the currency pair USD/Yen. The path structure 402, as a combined three-hop path structure, may include all of the current three-hop paths between USD and Yen in the currency exchange network that are made available by the path finding computing device 100. Other three-hop paths may be available in the currency exchange network, but may not be included in the path structure 402 due to the past new or updated orders, combined one-hop path structures, and combined two-hop path structures not having been determined to be important enough to be pass on to, or between, the threads of the path finder 110. The three-hop paths 44, 445, 446, and 447, may be ordered by price level within the path structure 402. The three-hop path 444 may go from USD to EUR in hop 419, from EUR to GBP in hop 420, and from AUD to Yen in hop 421. The three-hop path 445 and may go from USD to AUD in hop 422, AUD to GBP in hop 423, and GBP to Yen in hop 424. The three-hop path 446 and may go from USD to GBP in hop 425, GBP to EUR in hop 426, and EUR to Yen in hop 427. The three-hop path 447 and may go from USD to CAD in hop 428, CAD to EUR in hop 429, and EUR to Yen in hop 430.

Figure 4B:
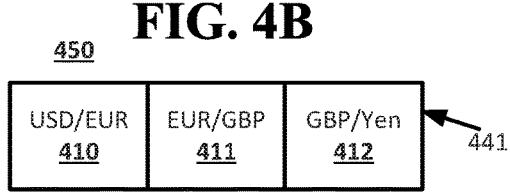
FIG. 4B shows an example combine operation suitable for multi-hop path finding according to an implementation of the disclosed subject matter.

FIG. 4B shows an example combine operation suitable for multi-hop path finding according to an implementation of the disclosed subject matter. The combine operation may select the paths at the first, or best, price levels available in the path structures 401 and 402. The three-hop path 441 may be at the first price level in the path structure 401, and the three-hop path 444 may be at the first price level in the path structure 402. The combine operation may determine that the price level of the three-hop path 441 does not show a precipitous drop from the price level of the three-hop path 444, and is not included in the path structure 402. The combine operation may determine that the price level of the three-hop path 441 is better than the price level of the three-hop path 444. The three-hop path 441 may be inserted into a combine result structure 450 as the first path of the combine result structure 450. The combine result structure 450 may be, for example, the new combined three-hop path structure.

Figure 4C:
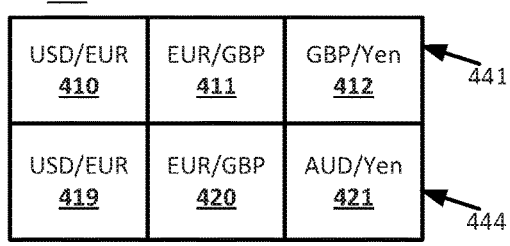
FIG. 4C shows an example combine operation suitable for multi-hop path finding according to an implementation of the disclosed subject matter.

FIG. 4C shows an example combine operation suitable for multi-hop path finding according to an implementation of the disclosed subject matter. The combine operation may select, from among paths that have not yet been inserted into the combine result structure 450, the paths at the next price levels available in the path structures 401 and 402. The three-hop path 442 may be at the next price level in the path structure 401, and the three-hop path 444 may still be available to be selected at the first price level in the path structure 402. The combine operation may determine that the price level of the three-hop path 442 does not show a precipitous drop from the price level of the three-hop path 444, and is not included in the combine result structure 450. The combine operation may determine that the price level of the three-hop path 444 is better than the price level of the three-hop path 442. The three-hop path 444 may be inserted into the combine result structure 450 as the second path of the combine result structure 450.

FIG. 4D shows an example combine operation suitable for multi-hop path finding according to an implementation of the disclosed subject matter. The combine operation may select, from among paths that have not yet been inserted into the combine result structure 450, the paths at the next price levels available in the path structures 401 and 402. The three-hop path 442 may still be available to be selected in the path structure 401, and the three-hop path 445 may be at the next price level in the path structure 402. The combine operation may determine that the price level of the one-hop path 442 does not show a precipitous drop from the price level of the three-hop path 445, and is not included in the combine result structure 450. The combine operation may determine that the price level of the three-hop path 442 is not better than the price level of the three-hop path 445. The three-hop path 445 may be inserted into the combine result structure 450 as the third path of the combine result structure 450.

FIG. 4E shows an example combine operation suitable for multi-hop path finding according to an implementation of the disclosed subject matter. The combine operation may select, from among paths that have not yet been inserted into the combine result structure 450, the paths at the next price levels available in the path structures 401 and 402. The three-hop path 446 may be at the next price level in the path structure 402, and the three-hop path 442 may still be available to be selected in the path structure 402. The combine operation may determine that the price level of the three-hop path 442 does not show a precipitous drop from the price level of the three-hop path 446, and is not included in the combine result structure 450. The combine operation may determine that the price level of the three-hop path 442 is better than the price level of the three-hop path 446. The three-hop path 442 may be inserted into the combine result structure 450 as the fourth path of the combine result structure 450.

FIG. 4F shows an example combine operation suitable for multi-hop path finding according to an implementation of the disclosed subject matter. The combine operation may select, from among paths that have not yet been inserted into the combine result structure 450, the paths at the next price levels available in the path structures 401 and 402. The three-hop path 443 may be at the next price level in the path structure 401, and the three-hop path 466 may still be available to be selected in the path structure 402. The combine operation may determine that the price level of the three-hop path 443 does not show a precipitous drop from the price level of the three-hop path 446, and is not included in the combine result structure 450. The combine operation may determine that the price level of the three-hop path 446 is better than the price level of the three-hop path 443. The three-hop path 446 may be inserted into the combine result structure 450 as the fifth path of the combine result structure 450.

FIG. 4G shows an example combine operation suitable for multi-hop path finding according to an implementation of the disclosed subject matter. The combine operation may select, from among paths that have not yet been inserted into the combine result structure 450, the paths at the next price levels available in the path structures 401 and 402. The three-hop path 443 may still be available to be selected in the path structure 401, and the three-hop path 447 may be at the next price level in the path structure 402. The combine operation may determine that the price level of the three-path 443 does not show a precipitous drop from the price level of the three-hop path 447, and is not included in the combine result structure 450. The combine operation may determine that the price level of the three-hop path 447 is better than the price level of the three-hop path 443. The three-hop path 447 may be inserted into the combine result structure 450 as the sixth path of the combine result structure 450.

FIG. 4H shows an example combine operation suitable for multi-hop path finding according to an implementation of the disclosed subject matter. The combine operation may determine that there not paths in the path structure 402 that have not been inserted into the combine result structure 450. The combine operation may determine that the price level of the three-hop path 443 does not show a precipitous drop from the price level of the three-hop path 447. The three-hop path 443 may be inserted into the combine result structure 450 as the seventh path of the combine result structure 450. The combine operation may stop. The combine result structure 450 may be used to determine the result importance of the path structure 401 according to (2), by, for example, counting the paths from the path structure 401 and the path structure 402 that were incorporated into the combine result structure 450 before the combine operation stopped. The relative importance may be used, for example, to determine if the combine result structure 450 should be used to generate paths of a length one hop longer, for example four-hop paths.

If, during a combine operation, a precipitous drop is determined based on the price level of a selected path on the right-hand side being lower, by some threshold amount, than a selected path on the left-hand side, any remaining paths on the left-hand side may be added to the combine result structure and the combine operation may stop without considering any further paths on the right-hand side.

Figure 5:
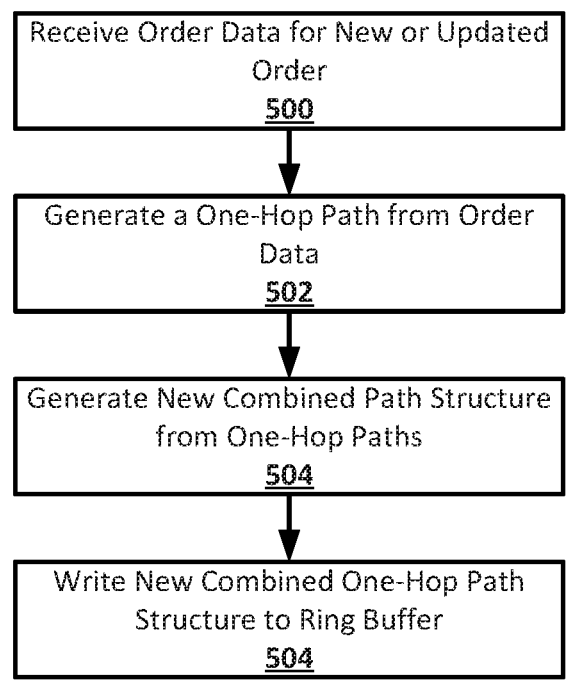
FIG. 5 shows an example procedure suitable for multi-hop path finding according to an implementation of the disclosed subject matter.

FIG. 5 shows an example procedure suitable for multi-hop path finding according to an implementation of the disclosed subject matter. At 500, order data for a new or updated order may be received. For example, the exchange adapters 150 of the path finding system 100 may receive order data describing a new or updated order from an exchange computing device, such as one of the exchange computing devices 250, 251, 252, 253, and 254. The new or updated order data may be based on a new or updated order made available on one of the exchange computing devices. The exchange adapters 150, before sending the order data to the path finder 110 of the path finding computing device 100, may evaluate the new or updated order according to (1) and compare the result to the set point to determine if the new or updated order is important enough to send to the path finding computing device 100. The set point may be based on the latency between order data arriving at the path finding computing device 100 and the completion of a combine operation by a thread, for example, the thread 221, responsible for generating the one-hop path structures stored in the persistent data structure for the one-hop path structures 201.

At 502, a one-hop path may be generated from order data. For example, the thread 221 of the path finder 110 on the path finding computing device 100 may add the new or updated order described by the received order data together with other orders whose order data previously received from the same exchange computing device, for the same currency pair, and with the same price level, or exchange rate, generating a one-hop path. The previously received order data may be stored as parts of a combined one-hop path structure in the persistent data structure for the one-hop path structures 201.

At 504, a new combined one-hop path structure may be generated from one-hop paths. For example, the one-hop path generated from the order data for the new or updated order may be combined with already extant one-hop paths in an already extant combined one-hop path structure for the same currency pair as the new or updated order to generate a new combined one-hop path structure. The one-hop paths in a new combined one-hop path structure may be for the same currency pair, and may be ordered by price level. If there is no extant combined one-hop path structure for the same currency pair as the new or updated order, a new combined one-hop path structure may be generated based on the generated one-hop path. New combined one-hop path structures may be stored, for example, by the thread 221, in the persistent data structure for one-hop path structures 201.

At 506, the new combined one-hop path structure may be written to a ring buffer. For example, the thread 221 may write the new combined one-path structure to the ring buffer 211. The thread 211 may then wait until additional order data for new or updated orders becomes available.

Figure 6:
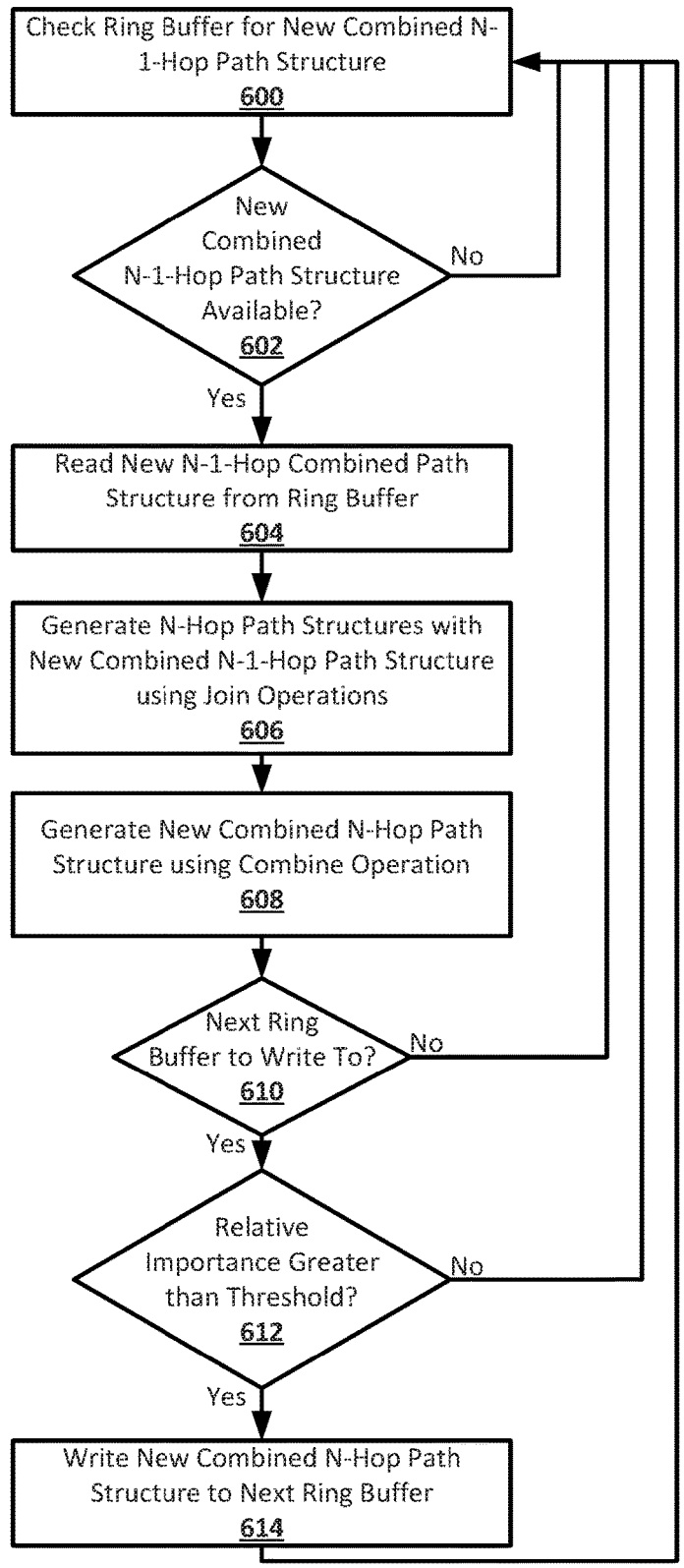
FIG. 6 shows an example procedure suitable for multi-hop path finding according to an implementation of the disclosed subject matter.

FIG. 6 shows an example procedure suitable for multi-hop path finding according to an implementation of the disclosed subject matter. At 600, a ring buffer may be checked for a new combined N-1-hop path structure. N may represent length of the paths the thread checking the ring buffer is responsible for. For example, a thread of the path finder 110, such as the thread 222, may check the appropriate one of the ring buffers 143, such as the ring buffer 211, to determine if a new combined one-hop path structure has been written to the ring buffer. The thread 222 may be responsible for two-hop paths, and thus may check the ring buffer 211 for a new combined one-hop path structure that may have been written by the thread 221. The path finder 110 may execute multiple threads, all of which may check appropriate ring buffers at any time regardless of the status of any of other thread.

At 602, if a new combined N-1-hop path structure is available in the checked ring buffer, flow may proceed to 604. Otherwise, flow may proceed to proceed back to 600, as the thread may continually check the ring buffer until a new combined N-1-hop path becomes available.

At 604, the new combined N-1-hop path structure may be read from the ring buffer. For example, the thread, such as the thread 222, may read the new combined one-hop path structure from the ring buffer 211.

At 606, N-hop path structures may be generated with the new combined N-1-hop path structure using join operations. For example, the thread 222 may perform join operations between the new combined one-hop path structure and other suitable combined one-hop paths structures read from the persistent data structure for one-hop path structures 201 to generate two-hop path structures. The two-hop path structures may be generated for any currency pair made possible by the new combined one-hop path structure and other combined one-hop path structures. The thread 222 may, for example, generate all two-hop path structures that are made possible based on the new combined one-hop path structure and the combined one-hop paths structures read from the persistent data structure for one-hop path structures 201. Other threads of the path finder 110 may generate path structures of any suitable length. For example, the thread 223 may generate three-hop path structures, the thread 224 may generate four-hop path structures, and so on.

At 608, new combined N-hop path structures may be generated using a combine operation. For example, the thread 222 may perform a combine operation with two-hop path structure generated based on the new combined one-hop path structure on the right-hand side of and previously existing combined two-hop path structure on the left-hand side. The previously existing combined two-hop path structure may include all previously generated two-hop paths that are still current for the same currency pair as the new two-hop path structure. A path may be current as long as the orders which make up the hops of the path are still available on the exchanges on which they originated. The combine operation may generate a combine result structure. For example, the combine operation performed by the thread

222 may generate a new combined two-hop path structure. The combine operation may also determine the relative importance of the new two-hop path structure according to (2). Other threads of the path finder 110 may perform combine operation to generate combined path structures of any suitable length. For example, the thread 223 may generate a combined three-hop path structure and the thread 224 may generated a combined four-hop path structure.

At 610, whether there is a next ring buffer to write to may be determined. If there is a next ring buffer to write to, flow may proceed to 612 where the relative importance of a new N-hop path structure may be compared to a threshold. Otherwise, flow may proceed back to 600, as there may be next ring buffer to write a new combined N-hop path structure into. For example, the thread 222 may be configured to write to the ring buffer 212, so the thread 222 may proceed with determining if the new combined two-hop path structure should be written to the ring buffer 212. The thread 226 may not be configured to write to a ring buffer, as the thread 226 may be responsible for the longest paths on the path finding computing device 100. After performing join and combine operations to generate new combined six-hop path structures, for example, at 606, the thread 226, having no ring buffer to write to, may proceed back to 600 where it may again check the ring buffer 215 to determine if the thread 225 has written a new combined five-hop path structure to the ring buffer 215. The thread 226 may not need to evaluate the relative importance of a new six-hop path structure after using it in a combine operation, as there may be no ring buffer into which the new combined six-hop path structure generated by the combine operation can be written.

At 612, if the relative importance of the new N-hop path structure is greater than a threshold, flow may proceed to 612. Otherwise, flow may proceed back to 600. The threshold may be, for example, a configurable function of the set point and the length of the paths the thread that performed the combine operation is responsible for. The threshold may increase as the path length increases so that, for example, there may be a higher threshold for relative importance when the combine operation is performed by the thread 225, responsible for paths with a length of five hops, than when the combine operation is performed by the thread 224, responsible for paths with a length of four hops. This may reduce the number of new combined path structures that are used in the generation of paths of longer lengths, reducing the processing time used by threads responsible for longer path lengths. This may even out the processing workload across all threads, and may allow longer path lengths to be generated in a timely manner.

At 612, the new combined N-hop path structure may be written to the next ring buffer. For example, the thread 222, responsible for paths with two hops, may write the new combined two-path structure to the ring buffer 212 because the new two-path structure used to generate that new combined two-hop path structure may have had an importance greater than the threshold. This may allow the thread 223, responsible for three-hop paths, to read the new combined two-hop path structure from the ring buffer 212 and use it to generate new combined three-hop path structures through join and combine operations. Threads of the path finder 110 may write new combined path structures to the ring buffer that is read by the thread responsible for paths of the next length. After writing to the next ring buffer for the thread responsible for paths of the next length, flow may proceed back to 600, where the thread may check the ring buffer written to by the thread for responsible for paths of the previous length. For example, the thread 222, responsible for paths with two hops, may again check the ring buffer 211 to determine if the thread 221, responsible for paths with one hop, has written a new combined one-hop path structure to the ring buffer 211.

The path finder 110 may execute any number of threads, such as the threads 221, 222, 223, 224, 225, and 226 on the path finding computing device 100. Each of the threads may be responsible for paths of different lengths. The thread responsible for one-hop paths, for example, the thread 221, may operate as described in FIG. 5. Threads responsible for all other path lengths may operate as described in FIG. 6. The threads may be executed simultaneously and asynchronously, proceeding through their operations independently of each other. Interaction between the threads may be through the writing and of new combined path structures to the ring buffers 143. For example, the thread 226 may cycle between 600 and 602 while the ring buffer 215 is empty, while the thread 224 performs join operations as at 606 to generate four-hop path structures using a new combined three-hop path structure and while the thread 225 performs a combine operation, as at 610, using a new five-hop path structure generated with a new combined four-hop path structure written to the ring buffer 214 by the thread 224. Due to the escalation of the threshold a new path structure must reach to be considered important enough for a new combined path structure based on it to be passed to the next thread as path lengths increase, the thread 226 may receive, through the ring buffer 215, a number of new combined five-hop path structures that is similar to, or not exponentially more than, the number of new combined four-hop path structure the thread 225 receives through the ring buffer 214. The thread 225 may in turn receive, through the ring buffer 214, a number of new combined four-hop path structures that is similar to, or not exponentially more than, the number of new combined three-hop path structure the thread 224 receives through the ring buffer 213, and so on for all of the threads of the path finder 110. This may reduce the computational load on the path finding computing device 100 while still allowing for the generation of multi-hop paths with a latency that ensures that the multi-hop paths are not outdated when they are generated. The path finding computing device 100 may be self-adjusting, as the adjustments to the set point made by the PID controller while the path finding computing device 100 is running may keep latency of the system within certain bounds, such that multi-hop paths are generated in a timely manner without resulting in the threads of the path finder 110 spending excessive amounts of time idle, increasing the efficiency of the generation of multi-hop paths by a system with constrained computational resources.

Figure 7:
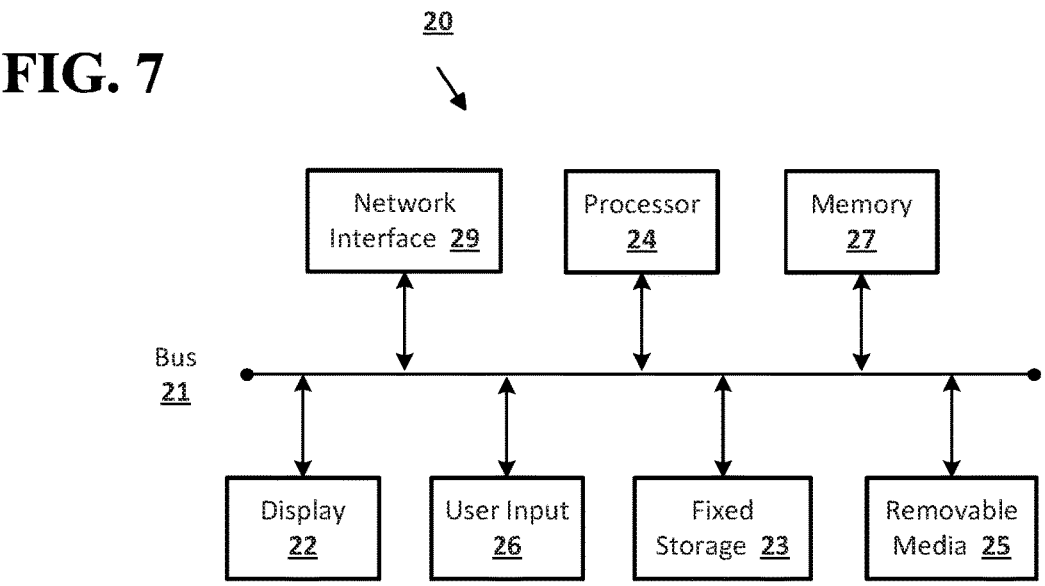
FIG. 7 shows a computer according to an embodiment of the disclosed subject matter.

Implementations of the presently disclosed subject matter may be implemented in and used with a variety of component and network architectures. FIG. 7 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 8.

Many other devices or components (not shown) may be connected in a similar manner (e.g., document scanners, digital cameras, and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
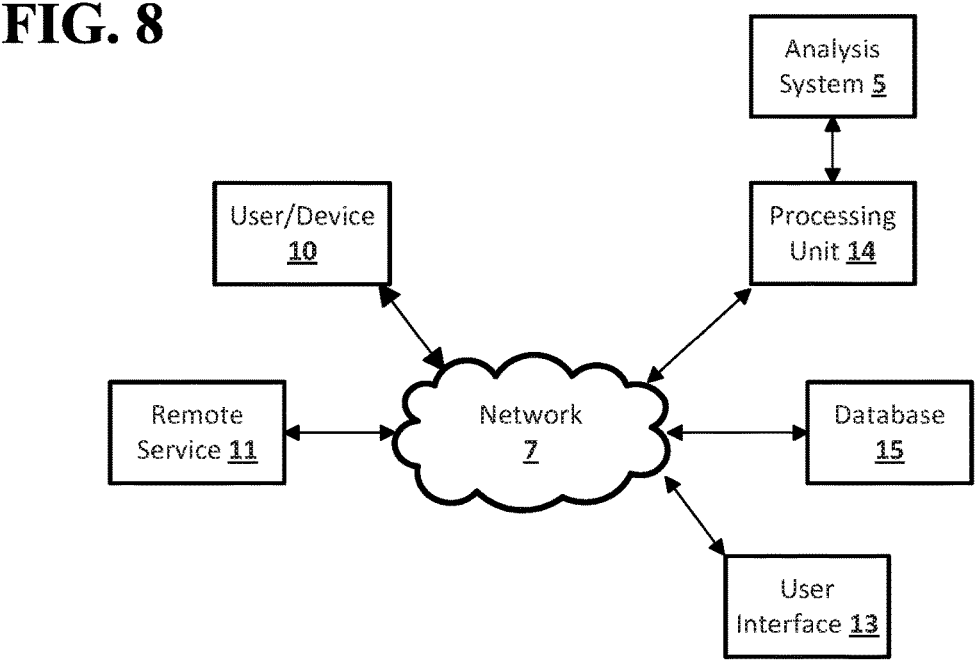
FIG. 8 shows a network configuration according to an embodiment of the disclosed subject matter.

FIG. 8 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   executing a first thread, the first thread repeating operations comprising:
      receiving order data describing an order, the order data comprising a currency pair, a price level, and a volume,
      generating a one-hop path structure based on the order data describing the order, the one-hop path structure comprising one or more one-hop paths for the currency pair,
      determining a relative importance value for the generated one-hop path structure, and
      writing the generated one-hop path structure to a first ring buffer when the relative importance value of the one-hop path structure greater than a first threshold, and
   executing a second thread, the second thread repeating operations comprising:
      checking the first ring buffer until at least one one-hop path structure is available in the first ring buffer after being written to the first ring buffer by the first thread,
      reading, from the first ring buffer, one of the at least one one-hop path structures written to the first ring buffer by the first thread,
      generating one or more two-hop path structures by joining the one-hop path structure read from the first ring buffer with one or more other one-hop path structures,
      determining a relative importance value for at least one of the generated one or more two-hop path structures, and
      writing, for any of the one or more generated two-hop path structures with a relative importance value greater than a second threshold, a combined two-hop path structure based on the generated two-hop path structure to a second ring buffer; and
   executing a third thread, the third thread repeating operations comprising:
      checking the second ring buffer until at least one combined two-hop path structure is available in the second ring buffer after being written to the second ring buffer by the second thread,
      reading, from the second ring buffer, one of the at least one combined two-hop path structures written to the second ring buffer by the second thread, and
      generating one or more three-hop path structures by joining the combined two-hop path structure read from the second ring buffer with one or more one-hop path structures.

2. The computer-implemented method of claim 1, wherein executing the third thread further comprises the third thread further repeating operations comprising:
   determining a relative importance value for at least one of the generated one or more three-hop path structures, and
   writing, for any of the one or more generated three-hop path structures with a relative importance value greater than a third threshold, a combined three-hop path structure based on the generated three-hop path structure to a second ring buffer.

3. The computer-implemented method of claim 1, wherein the first thread, second thread, and third thread operate concurrently and asynchronously on a computing device comprising a memory, and wherein the memory comprises the first ring buffer, the second ring buffer, and the third ring buffer.

4. The computer-implemented method of claim 1, wherein the first thread further writes generated one-hop path structures to a persistent data structure for one-hop path structures in a memory of a computing device, the second thread writes combined two-hop path structures to a persistent data structure for two-hop path structures in the memory of the computing device, and the third thread writes combined three-hop path structures to a persistent data structure for three-hop path structures in the memory of the computing device.

5. The computer-implemented method of claim 1, wherein a threshold used by a thread is based on a set point and number of hops in the paths of the path structures generated by the thread, and wherein the set point is based on an amount of time between the receiving of the order data describing the order by the first thread and the determining the relative importance value for the one-hop path structure by the first thread.

6. The computer-implemented method of claim 1, further comprising executing one or more additional threads, each of the one or more additional threads responsible for paths with a different number of hops, each additional thread of the one or more additional threads performing operations comprising:
   checking a ring buffer for the additional thread until at least one combined path structure is available after being written to the ring buffer for the additional thread by a thread responsible for paths with one fewer hop than a number of hops in paths the additional thread is responsible for,
   reading, from the ring buffer for the additional thread, one of the at least one combined path structures written to the ring buffer for the additional thread, and
   generating one or more path structures comprising paths with the number of hops the additional thread is responsible for by joining the combined path structure read from the ring buffer for the additional thread with one or more one-hop path structures.

7. The computer-implemented method of claim 6, executing the one or more additional threads, each of the one or more additional threads responsible for paths with a different number of hops, further comprises each additional thread of the one or more additional threads further performing operations comprising:
   determining a relative importance value for at least one of the generated one or more path structures, and
   writing, for any of the generated path structures with a relative importance value greater than a threshold associated with the additional thread, a combined generated path structure based on the generated path structure to a ring buffer for another additional thread.

8. The computer-implemented method of claim 1 further comprising;
   determining an importance value of the order is greater than a value of a set point; and
   in response to determining the importance value of the order is greater than the value of the set point, sending the order data to the first thread.

9. A computer-implemented system comprising:
   one or more storage devices;
   a communications device that receives order data comprising a currency pair, a price level, and a volume from exchange computing devices; and
   one or more processors that execute one or more threads, the one or more threads comprising:
   a first thread that receives order data describing an order, the order data comprising a currency pair, a price level, and a volume, generates a one-hop path structure based on the order data describing the order, the one-hop path structure comprising one or more one-hop paths for the currency pair, determines a relative importance value for the generated one-hop path structure, and writes the generated one-hop path structure to a first ring buffer when the relative importance value of the one-hop path structure greater than a first threshold,
   a second thread that checks the first ring buffer until at least one one-hop path structure is available in the first ring buffer after being written to the first ring buffer by the first thread, reads, from the first ring buffer, one of the at least one one-hop path structures written to the first ring buffer by the first thread, generates one or more two-hop path structures by joining the one-hop path structure read from the first ring buffer with one or more other one-hop path structures, determines a relative importance value for at least one of the generated one or more two-hop path structures, and writes, for any of the generated two-hop path structures with a relative importance value greater than a second threshold, a combined two-hop path structure based on the generated two-hop path structure to a second ring buffer, and
   a third thread, that checks the second ring buffer until at least one combined two-hop path structure is available in the second ring buffer after being written to the second ring buffer by the second thread, reads, from the second ring buffer, one of the at least one combined two-hop path structures written to the second ring buffer by the second thread, and generates one or more three-hop path structures by joining the two-hop path structure read from the second ring buffer with one or more one-hop path structures.

10. The computer-implemented system of claim 9, wherein the third thread further determines a relative importance value for at least one of the generated one or more three-hop path structures, and writes, for any of the generated three-hop path structures with a relative importance value greater than a third threshold, a combined three-hop path structure based on the generated two-hop path structure to a third ring buffer.

11. The computer-implemented system of claim 9, wherein the first thread further writes generated one-hop path structures to a persistent data structure for one-hop path structures stored in the one or more storage devices, the second thread writes combined two-hop path structures to a persistent data structure for two-hop path structures stored in the one or more storage devices, and the third thread writes combined three-hop path structures to a persistent data structure for three-hop path structures stored in the one or more storage devices.

12. The computer-implemented system of claim 9, wherein the one or more processors further execute one or more additional threads, each of the one or more additional threads responsible for paths with a different number of hops, wherein each additional thread of the one or more additional threads checks a ring buffer for the additional thread until at least one combined path structure is available after being written to the ring buffer for the additional thread by a thread responsible for paths with one fewer hop than a number of hops in paths the additional thread is responsible for, reads, from the ring buffer for the additional thread, one of the at least one combined path structures written to the ring buffer for the additional thread, and generates one or more path structures comprising paths with the number of hops the additional thread is responsible for by joining the combined path structure read from the ring buffer for the additional thread with one or more one-hop path structures.

13. A computer-implemented method comprising:
receiving order data describing an order, the order data comprising a currency pair, a price level, and a volume;
generating a one-hop path structure based on the order data describing the order, the one-hop path structure comprising one or more one-hop paths for the currency pair;
writing the one-hop path structure to a first ring buffer;
reading the one-hop path structure from the first ring buffer;
generating one or more two-hop path structures by joining the one-hop path structure with one or more other one-hop path structures;
determining that a value for the relative importance of at least one of the two-hop path structures is greater than a threshold; and
in response to determining that the value for the relative importance of the at least one of the two-hop path structures is greater than the threshold, writing a combined two-hop path structure generated based on the at least one of the two-hop path structures to a second ring buffer.

14. The computer-implemented method of claim 13, further comprising:
reading the combined two-hop path structure from the second ring buffer;
generating one or more three-hop path structures by joining the combined two-hop path structure with one or more one-hop path structures;
determining that a value for the relative importance of at least one of the one or more three-hop path structures is greater than a second threshold, wherein the second threshold is higher than the first threshold; and
in response to determining that the value for the relative importance of the at least one of the three-hop path structures is greater than the threshold, writing a combined three-hop path structure based on the at least one of the three-hop path structures to a third ring buffer.

15. The computer-implemented method of claim 13, further comprising:
reading a combined path structure from one ring buffer of a plurality of ring buffers;
generating one or more path structures with a number of hops by joining the combined path structure with the one or more one-hop path structures;
determining that a value for the relative importance of at least one of the generated one or more path structures is greater than another threshold, wherein the another threshold is based on the number of hops in the generated one or more path structures such that the another threshold is higher as the number of hops is higher; and
in response to determining that the value for the relative importance of the at least one of the generated one or more path structures is greater than the another threshold, writing another combined path structure based on the at least one of the one or more path structures to an another ring buffer of the plurality of ring buffers.

16. The computer-implemented method of claim 13, further comprising:
receiving additional order data describing another order, the additional order data comprising a currency pair, a price level, and a volume;
generating a second one-hop path structure based on the additional order data describing the another order, the second one-hop path structure comprising one or more one-hop paths for the currency pair described in the additional order data;
writing the second one-hop path structure to the first ring buffer;
reading the second one-hop path structure from the first ring buffer;
generating one or more additional two-hop path structures by joining the second one-hop path structure with one or more of the other one-hop path structures;
determining that a value for the relative importance of at least one of the additional two-hop path structures is not greater than the threshold; and
in response to determining that the value for the relative importance of the at least one of the additional two-hop path structures is not greater than the threshold, not writing another combined two-hop path structure based on the at least one of the additional two-hop path structures to the second ring buffer.

17. The computer-implemented method of claim 13, wherein, before the order data is received, the order is determined to a value for importance that exceeds a threshold based on a set point, wherein the set point is based on a latency of processing order data for a new order.

18. The computer-implemented method of claim 13, wherein determining that a value for the relative importance of the two-hop path structure is greater than a threshold comprises performing a combine operation using the two-hop path structure and a path structure comprising one or more two-hop paths for the same currency pair as the two-hop path structure, wherein the combine operation compares at least one price level from the two-hop path structure to at least one price level from the path structure comprising the one or more two-hop paths.

19. The computer-implemented method of claim 18, wherein the threshold is a value determined based on a set point and a maximum length of a path in the path structure comprising one or more two-hop paths, wherein the set point is based on a latency of processing order data for a new order.

20. A system comprising: one or more computers and one or more storage devices storing instructions which are operable, when executed by the one or more computers, to cause the one or more computers to perform operations comprising:
receiving order data describing an order, the order data comprising a currency pair, a price level, and a volume;
generating a one-hop path structure based on the order data describing the order, the one-hop path structure comprising one or more one-hop paths for the currency pair;
writing the one-hop path structure to a first ring buffer;
reading the one-hop path structure from the first ring buffer;
generating one or more two-hop path structures by joining the one-hop path structure with one or more other one-hop path structures;
determining that a value for the relative importance of at least one of the two-hop path structures is greater than a threshold; and
in response to determining that the value for the relative importance of the at least one of the two-hop path structures is greater than the threshold, writing a combined two-hop path structure generated based on the at least one of the two-hop path structures to a second ring buffer.

* * * * *